Aug. 12, 1969     J. E. NEWLAND ET AL     3,461,365
DISPLAY SYSTEM AND METHODS
Filed Oct. 26, 1964     13 Sheets-Sheet 1
*Fig. 1.*
|  | X AXIS PULSES | | |
|---|---|---|---|
|  | X | -X | 0 |
| Y | X, Y | -X, Y | Y |
| -Y | X, -Y | -X, -Y | -Y |
| 0 | X | -X | 0 |
Y AXIS PULSES
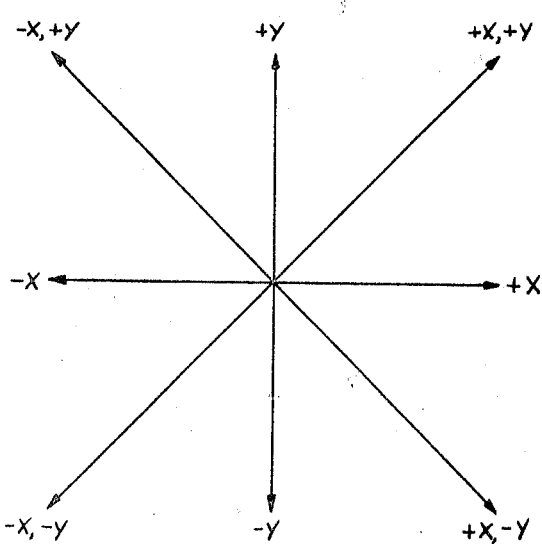
*Fig. 2.*
*Fig. 3.*
|  | X AXIS PULSES | | | | |
|---|---|---|---|---|---|
|  | X/2 | X | -X/2 | -X | 0 |
| Y/2 | X/2, Y/2 | X, Y/2 | -X/2, Y/2 | -X, Y/2 | Y/2 |
| Y | X/2, Y | X, Y | -X/2, Y | -X, Y | Y |
| -Y/2 | X/2, -Y/2 | X, -Y/2 | -X/2, -Y/2 | -X, -Y/2 | -Y/2 |
| -Y | X/2, -Y | X, -Y | -X/2, -Y | -X, -Y | -Y |
| 0 | X/2 | X | -X/2 | -X | 0 |
Y AXIS PULSES
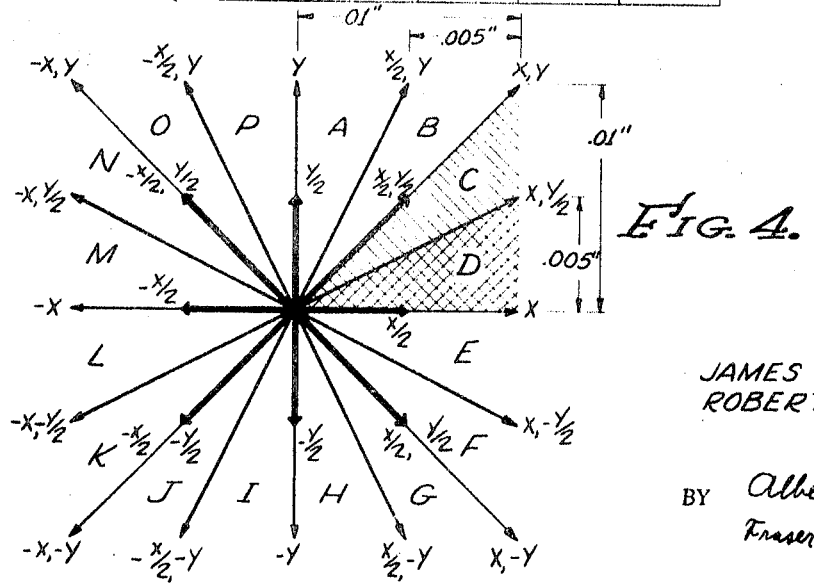
*Fig. 4.*
JAMES E. NEWLAND
ROBERT C. MORTON
INVENTORS.
BY Albert Rosen
Fraser and Bogucki
ATTORNEYS.

Aug. 12, 1969  J. E. NEWLAND ET AL  3,461,365
DISPLAY SYSTEM AND METHODS
Filed Oct. 26, 1964  13 Sheets-Sheet 2

JAMES E. NEWLAND
ROBERT C. MORTON
INVENTORS.

BY Albert Rosen
Fraser and Bogucki
ATTORNEYS.

Aug. 12, 1969

J. E. NEWLAND ET AL 3,461,365

DISPLAY SYSTEM AND METHODS

Filed Oct. 26, 1964

JAMES E. NEWLAND
ROBERT C. MORTON
INVENTORS.

BY Albert Rosen
Fraser and Bogucki

ATTORNEYS.

LEAST TIME APPROXIMATION FLOW CHART

LEAST TIME APPROXIMATION PLOT

INVENTORS.
JAMES E. NEWLAND
ROBERT C. MORTON
BY Albert Rosen
Fraser and Bogucki
ATTORNEYS.

Aug. 12, 1969          J. E. NEWLAND ET AL          3,461,365
                       DISPLAY SYSTEM AND METHODS
Filed Oct. 26, 1964                                  13 Sheets-Sheet 7

| SEQUENTIAL STEP | FIG. 13. FLOW CHART STEP | NT=\|ΔX\|=22 | 2(NR)=12 | NC | NA | DECISION (CIRCLED NOS. ARE FIG. 13. STEPS) | MOVEMENT |
|---|---|---|---|---|---|---|---|
| INITIAL | — | 22 | 12 | 22 | 22÷2=11 | — | — |
| 1 | 1 | 22 | 12 | 22 | 11 | GO TO ② | — |
| 2 | 2 | 22 | 12 | 22 | 11+12=23 | GO TO ③ | — |
| 3 | 3 | 22 | 12 | 22 | 23 | GO TO ⑤ | — |
| 4 | 5 | 22 | 12 | 22 | 23-22=1 | GO TO ⑥ | — |
| 5 | 6 | 22 | 12 | 22 | 1 | GO TO ⑦ | X+Y/2 |
| 6 | 7 | 22 | 12 | 22-2=20 | 1 | GO TO ① | — |
| 7 | 1 | 22 | 12 | 20 | 1 | GO TO ② | — |
| 8 | 2 | 22 | 12 | 20 | 1+12=13 | GO TO ③ | — |
| 9 | 3 | 22 | 12 | 20 | 13 | GO TO ④ | — |
| 10 | 4 | 22 | 12 | 20 | 13 | GO TO ⑦ | X |
| 11 | 7 | 22 | 12 | 20-2=18 | 13 | GO TO ① | — |
| 12 | 1 | 22 | 12 | 18 | 13 | GO TO ② | — |
| 13 | 2 | 22 | 12 | 18 | 13+12=25 | GO TO ③ | — |
| 14 | 3 | 22 | 12 | 18 | 25 | GO TO ⑤ | — |
| 15 | 5 | 22 | 12 | 18 | 25-22=3 | GO TO ⑥ | — |
| 16 | 6 | 22 | 12 | 18 | 3 | GO TO ⑦ | X+Y/2 |
| 17 | 7 | 22 | 12 | 18-2=16 | 3 | GO TO ① | — |
| 18 | 1 | 22 | 12 | 16 | 3 | GO TO ② | — |
| 19 | 2 | 22 | 12 | 16 | 3+12=15 | GO TO ③ | — |
| 20 | 3 | 22 | 12 | 16 | 15 | GO TO ④ | — |
| 21 | 4 | 22 | 12 | 16 | 15 | GO TO ⑦ | X |
| 22 | 7 | 22 | 12 | 16-2=14 | 15 | GO TO ① | — |
| 23 | 1 | 22 | 12 | 14 | 15 | GO TO ② | — |
| 24 | 2 | 22 | 12 | 14 | 15+12=27 | GO TO ③ | — |
| 25 | 3 | 22 | 12 | 14 | 27 | GO TO ⑤ | — |
| 26 | 5 | 22 | 12 | 14 | 27-22=5 | GO TO ⑥ | — |
| 27 | 6 | 22 | 12 | 14 | 5 | GO TO ⑦ | X+Y/2 |
| 28 | 7 | 22 | 12 | 14-2=12 | 5 | GO TO ① | — |
| 29 | 1 | 22 | 12 | 12 | 5 | GO TO ② | — |
| 30 | 2 | 22 | 12 | 12 | 5+12=17 | GO TO ③ | — |
| 31 | 3 | 22 | 12 | 12 | 17 | GO TO ④ | — |
| 32 | 4 | 22 | 12 | 12 | 17 | GO TO ⑦ | X |
| 33 | 7 | 22 | 12 | 12-2=10 | 17 | GO TO ① | — |
| 34 | 1 | 22 | 12 | 10 | 17 | GO TO ② | — |
| 35 | 2 | 22 | 12 | 10 | 17+12=29 | GO TO ③ | — |
| 36 | 3 | 22 | 12 | 10 | 29 | GO TO ⑤ | — |
| 37 | 5 | 22 | 12 | 10 | 29-22=7 | GO TO ⑥ | — |
| 38 | 6 | 22 | 12 | 10 | 7 | GO TO ⑦ | X+Y/2 |
| 39 | 7 | 22 | 12 | 10-2=8 | 7 | GO TO ① | — |
| 40 | 1 | 22 | 12 | 8 | 7 | GO TO ② | — |
| 41 | 2 | 22 | 12 | 8 | 7+12=19 | GO TO ③ | — |
| 42 | 3 | 22 | 12 | 8 | 19 | GO TO ④ | — |
| 43 | 4 | 22 | 12 | 8 | 19 | GO TO ⑦ | X |
| 44 | 7 | 22 | 12 | 8-2=6 | 19 | GO TO ① | — |
| 45 | 1 | 22 | 12 | 6 | 19 | GO TO ② | — |
| 46 | 2 | 22 | 12 | 6 | 19+12=31 | GO TO ③ | — |
| 47 | 3 | 22 | 12 | 6 | 31 | GO TO ⑤ | — |
| 48 | 5 | 22 | 12 | 6 | 31-22=9 | GO TO ⑥ | — |
| 49 | 6 | 22 | 12 | 6 | 9 | GO TO ⑦ | X+Y/2 |
| 50 | 7 | 22 | 12 | 6-2=4 | 9 | GO TO ① | — |
| 51 | 1 | 22 | 12 | 4 | 9 | GO TO ② | — |
| 52 | 2 | 22 | 12 | 4 | 9+12=21 | GO TO ③ | — |
| 53 | 3 | 22 | 12 | 4 | 21 | GO TO ④ | — |
| 54 | 4 | 22 | 12 | 4 | 21 | GO TO ⑦ | X |
| 55 | 7 | 22 | 12 | 4-2=2 | 21 | GO TO ① | — |
| 56 | 1 | 22 | 12 | 2 | 21 | GO TO ② | — |
| 57 | 2 | 22 | 12 | 2 | 21+12=33 | GO TO ③ | — |
| 58 | 3 | 22 | 12 | 2 | 33 | GO TO ⑤ | — |
| 59 | 5 | 22 | 12 | 2 | 33-22=11 | GO TO ⑥ | — |
| 60 | 6 | 22 | 12 | 2 | 11 | GO TO ⑦ | X+Y/2 |
| 61 | 7 | 22 | 12 | 2-2=0 | 11 | GO TO ① | — |
| 62 | 1 | 22 | 12 | 0 | 11 | GO TO ⑧ | — |
| 63 | 8 | 22 | 12 | 0 | 11 | EXIT | — |

LEAST TIME APPROXIMATION
FLOW TABLE

FIG. 14.

INVENTORS.
JAMES E. NEWLAND
ROBERT C. MORTON
BY Albert Rosen
Fraser and Bogucki
ATTORNEYS.

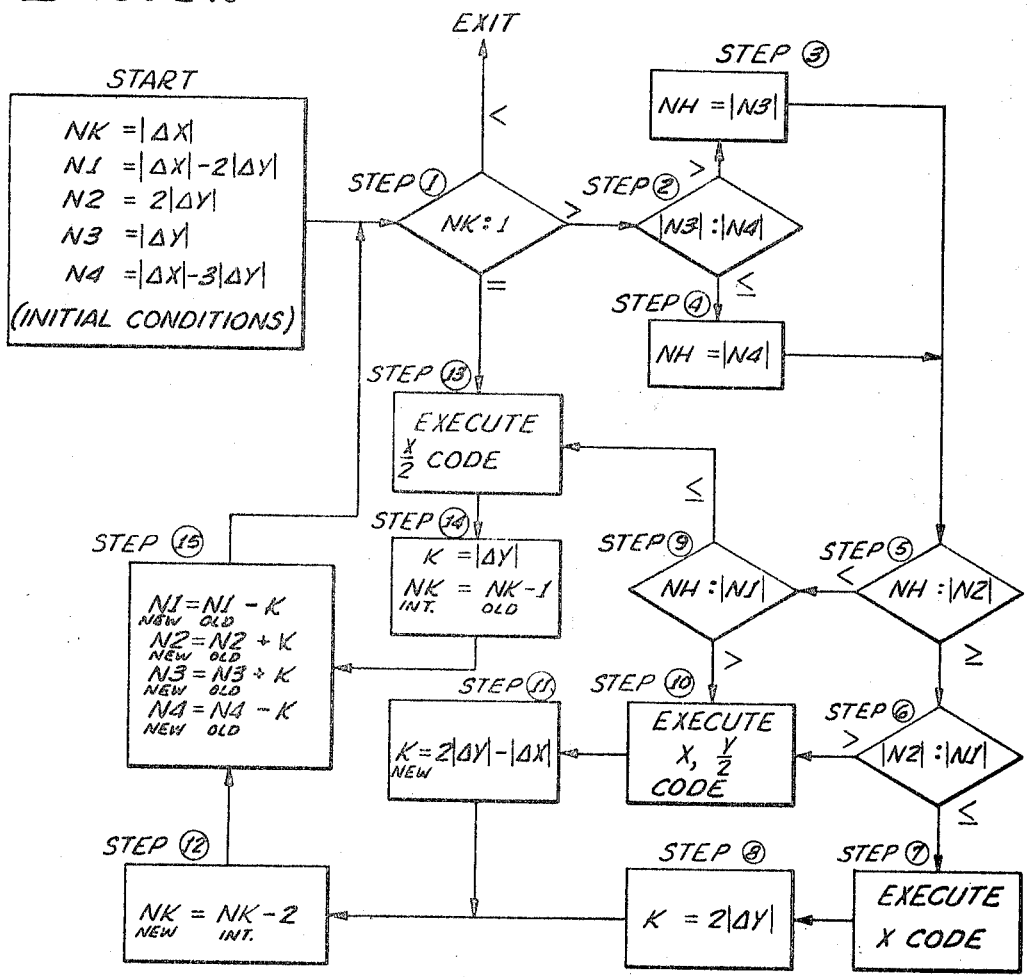
LEAST DEVIATION APPROXIMATION FLOW CHART
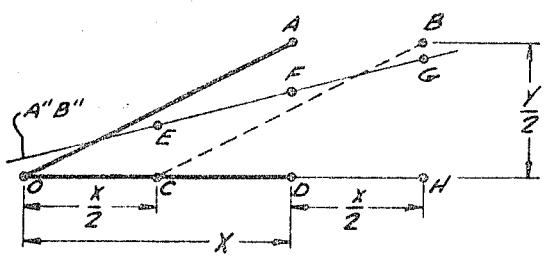
Fig. 16.

$|\Delta X| = 22$
$|\Delta Y| = 6$

| SEQUENTIAL STEP | FIG. 17 FLOW CHART STEP | NK | NH | K | N1 | N2 | N3 | N4 | DECISION (FIG. 17 STEP) | MOVEMENT |
|---|---|---|---|---|---|---|---|---|---|---|
| INITIAL | — | 22 | — | — | 10 | 12 | 6 | 4 | — | — |
| 1 | 1 | 22 | — | — | 10 | 12 | 6 | 4 | GO TO ② | — |
| 2 | 2 | 22 | — | — | 10 | 12 | 6 | 4 | GO TO ④ | — |
| 3 | 4 | 22 | 4 | — | 10 | 12 | 6 | 4 | GO TO ⑤ | — |
| 4 | 5 | 22 | 4 | — | 10 | 12 | 6 | 4 | GO TO ⑨ | — |
| 5 | 9 | 22 | 4 | — | 10 | 12 | 6 | 4 | GO TO ⑬ | — |
| 6 | 13 | 22 | 4 | — | 10 | 12 | 6 | 4 | GO TO ⑭ | X/2 |
| 7 | 14 | 22-1=21 | 4 | 6 | 10 | 12 | 6 | 4 | GO TO ⑮ | — |
| 8 | 15 | 21 | 4 | 6 | 10-6=4 | 12+6=18 | 6+6=12 | 4-6=-2 | GO TO ① | — |
| 9 | 1 | 21 | 4 | 6 | 4 | 18 | 12 | -2 | GO TO ② | — |
| 10 | 2 | 21 | 4 | 6 | 4 | 18 | 12 | -2 | GO TO ④ | — |

*LEAST DEVIATION APPROXIMATION TABLE*

*LEAST DEVIATION APPROXIMATION PLOT*

Aug. 12, 1969          J. E. NEWLAND ET AL          3,461,365
                       DISPLAY SYSTEM AND METHODS
Filed Oct. 26, 1964                              13 Sheets-Sheet 12

JAMES E. NEWLAND
ROBERT C. MORTON
        INVENTORS

BY Albert Rosen
   Fraser and Bogucki
          ATTORNEYS ced Aug. 12, 1969

3,461,365
DISPLAY SYSTEM AND METHODS
James E. Newland, Fullerton, and Robert C. Morton, Anaheim, Calif., assignors to California Computer Products, Inc., Anaheim, Calif., a corporation of California
Filed Oct. 26, 1964, Ser. No. 406,364
Int. Cl. H02p 1/54, 5/46, 7/68
U.S. Cl. 318—18                                    12 Claims

ABSTRACT OF THE DISCLOSURE

Arrangements for controlling a stepping motor having a rotor which responds to the magnetic fields of selected energized sets of field coils to produce rotation of the rotor less than a normal increment by simultaneously energizing two pairs of field coils between the sequential energization of adjacent individual pairs of coils, together with methods and apparatus for analyzing line slope and controlling one or more stepping motors to position a plotting mechanism in accordance therewith.

---

This invention relates to systems and methods for visually displaying digital data, and, while not limited thereto, proves especially advantageous in the presentation of digital computer processed data in ink-pen plotted graphical form.

Present digital incremental plotters provide a fixed size plotter motion for each incremental step. For example, one particular plotter in general use provides .01 inch steps, with each step thus able to provide a plotted line segment .01 inch in length. A typical plotter includes two stepping motors, one to provide incremental motion along the X axis and the other to provide incremental motion along the Y axis; thus the basic plotting movements on each axis are 0 and 180° (+X and −X axis motion) and 90° and 270° (+Y and −Y axis motion). The simultaneous actuation of both step motors produces a simultaneous motion along the X and Y axes, yielding 45° lines. In such an arrangement, all plotted lines are produced at angles that are multiples of 45° and the plotter is precluded from plotting lines falling between the lines, at angles other than those that are multiples of 45°, except by approximation. When lines at angles other than multiples of 45° are to be plotted, a sawtooth-like line is produced, approximating the desired line. While the degree of jaggedness of the sawtooth combination can be reduced by reducing the plotting step size (for example, from .01 inch to .005 inch per step), such an expedient also reduces the overall plotting speed which is a function of the incremental stepping distance of the system.

What is desired therefore is a plotting system having an arrangement for providing a larger plotting step size with the capability of shifting to a smaller plotting step size wherever needed in order to reproduce a desired line with greater fidelity and precision. Such a capability might be provided by utilizing a stepping motor arrangement in which each step motor has an associated gear train having a "gear shift" arrangement allowing different gears to be brought into the gear train as needed whenever it is desired to shift the size of the plotting step increment. However, this approach is not satisfactory since it involves a cumbersome arrangement at best, and also it introduces additional gear problems such as backlash, wear, inertia and the like.

It is therefore an object of the present invention to provide an improved digital incremental plotting system having the capability of a variable plotting step size.

It is also an object of the present invention to provide such a capability by means of purely electronic control.

It is a particular object of the present invention to provide an improved variable control of the step size developed by the stepping motors of a digital incremental plotting system without appreciable change in the design of existing stepping motors.

It is a further object of the present invention to provide for variable step size in a digital incremental plotting system with improved selective control over various control parameters.

In brief, the present invention relates to arrangements for controlling a stepping motor through the selective energization of multiple sets of field coils in order to develop a partially shifted magnetic field in the motor, to produce a rotation of the stepping motor rotor which is less than the rotation normally produced when the energizing circuit is switched from one coil set to another. In one particular arrangement in accordance with the invention, a stepping motor is employed having three pairs of stator coils and poles, and a four pole rotor. The rotor of such a stepping motor advances 1/12 revolution (30°) each time the energizing circuit is switched from one pair of stator coils to another. The direction of rotation is determined by the sequence in which the stator coils are energized. The stepping motor rotor may be coupled to a plotting mechanism by a suitable gear train to effect a .01 inch relative motion between a plotting pen and the plotting medium for each 30° rotation of the rotor. In accordance with the invention, this relative motion may be selectively cut in half by simultaneously energizing two pairs of stator coils of the stepping motor following the energization of only one pair of coils, or by energizing only a single pair of coils where two pairs of coils were previously energized. Under such circumstances, the magnetic field developed by the stator is shifted by one-half the angle of shift when the energizing circuit is transferred from one pair of coils to another so that the rotor rotates only one-half the usual distance (in this case, 15° as contrasted with 30° of rotation).

Operation of a stepping motor in this fashion permits a more precise approximation of a particular line to be plotted without the sacrifice in plotting speed which is a concomitant of a fixed reduction in plotting step size. Particular methods and apparatus in accordance with the invention are provided for selectively controlling the plotting system stepping motors to vary the step size in order to follow the line to be plotted. These methods involve an analysis of the line to be plotted so as to determine various approximations which permit the reproduction of the line with minimum plotting time or with minimum plotting error. In the case of the minimum plotting time approximation there is no loss in plotting speed, although by virtue of the invention an improved approximation of the line is derived.

A better understanding of the invention may be had from a consideration of the following detailed description, taken in conjunction with the accompanying thirteen sheets of drawings, wherein:

FIG. 1 is a chart of the step commands to which prior art stepping motors are limited in response;

FIG. 2 is a diagram showing the eight different plotting directions possible with a pair of stepping motors of the prior art, with the directions depicted in FIG. 2 corresponding to the similarly identified directions noted in FIG. 1;

FIG. 3 is a chart showing the step commands and increments of which arrangements in accordance with the present invention are capable;

FIG. 4 is a diagram of the plotting directions of which the arrangements in accordance with the present invention are capable, with the directions identified in this FIG. 4 corresponding to the similarly identified directions noted in FIG. 3;

FIG. 14 is a table showing the procedures involved in following the flow chart of FIG. 13 for a given approximation of the line segment shown in FIG. 15;

Figure 13:
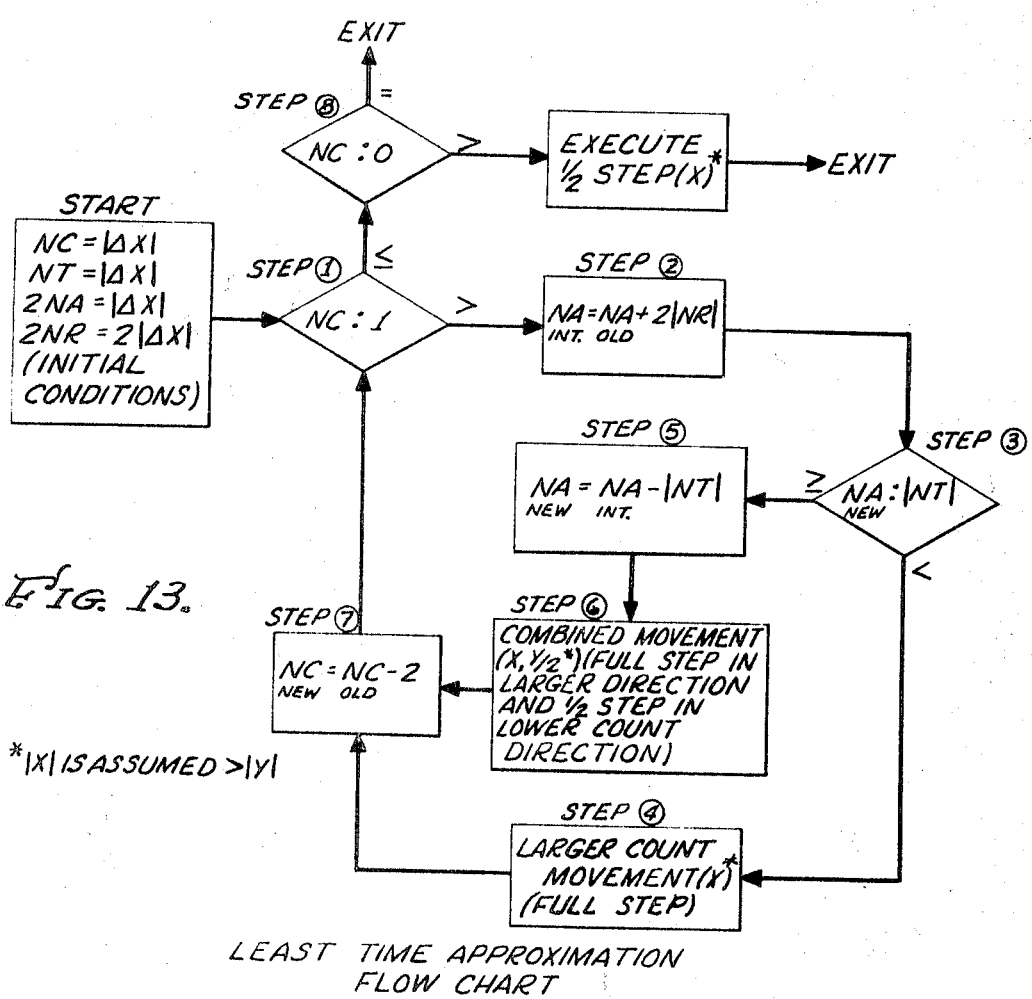
FIG. 13 is a block diagram in the form of a flow chart showing the steps involved in the Minimum Plotting Time Method in accordance with the invention.
Figure 15:
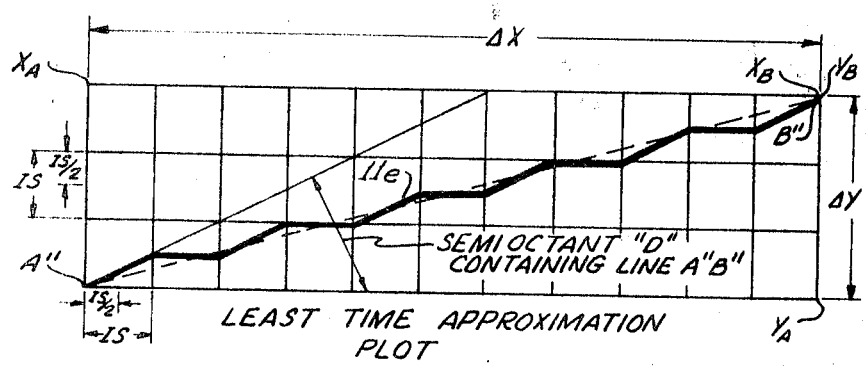
Figures 18, 19:
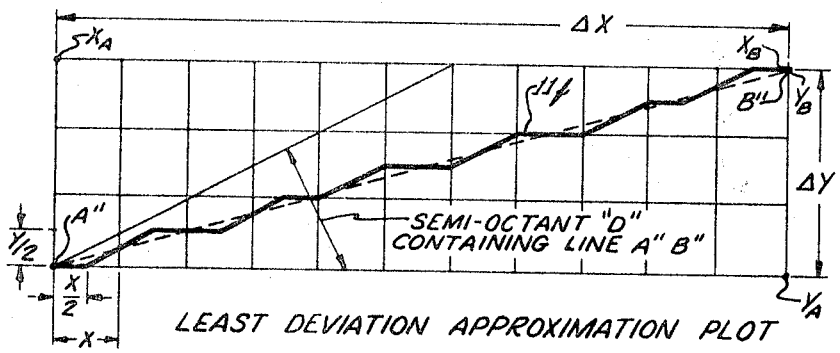
Figure 20:
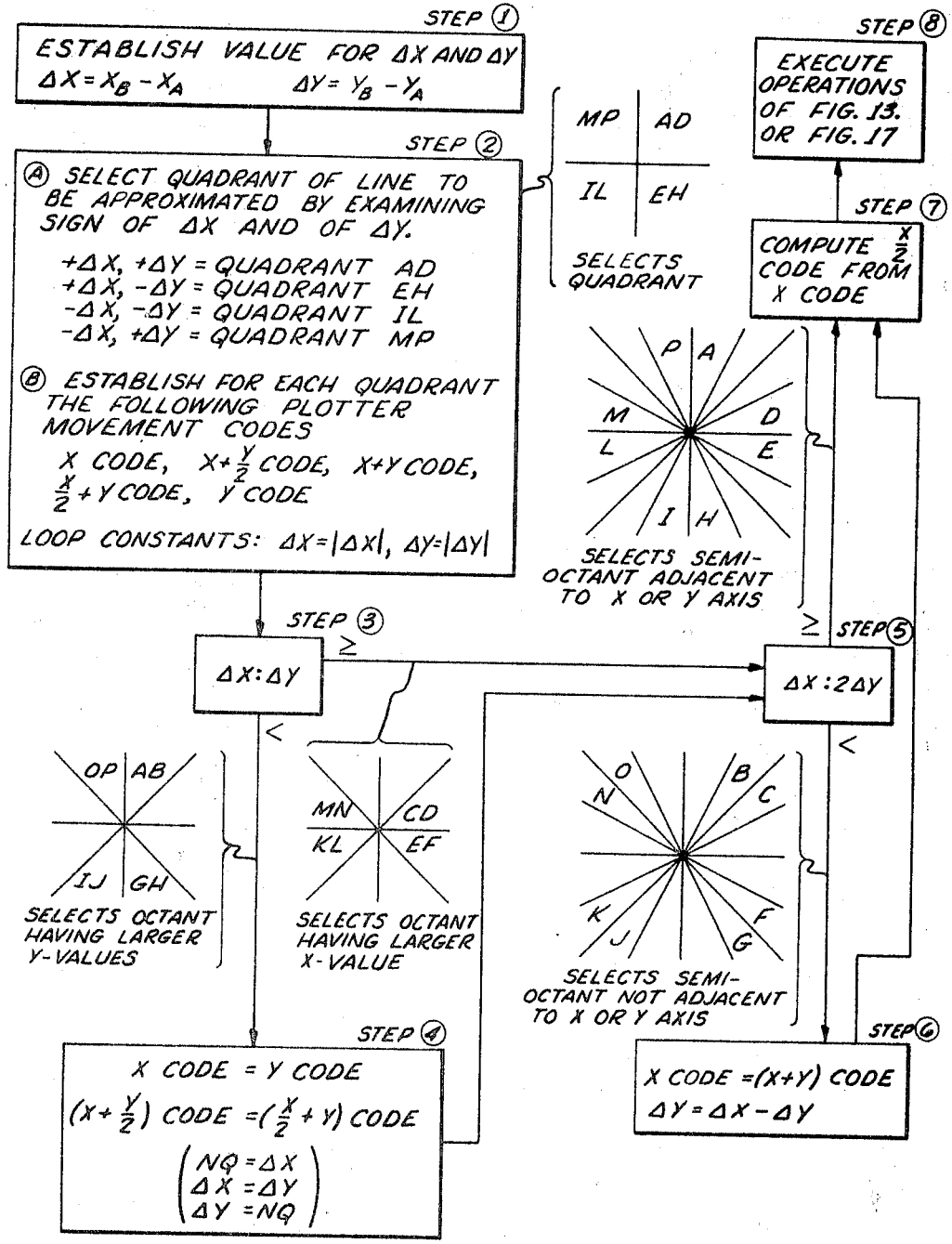
Figure 21:
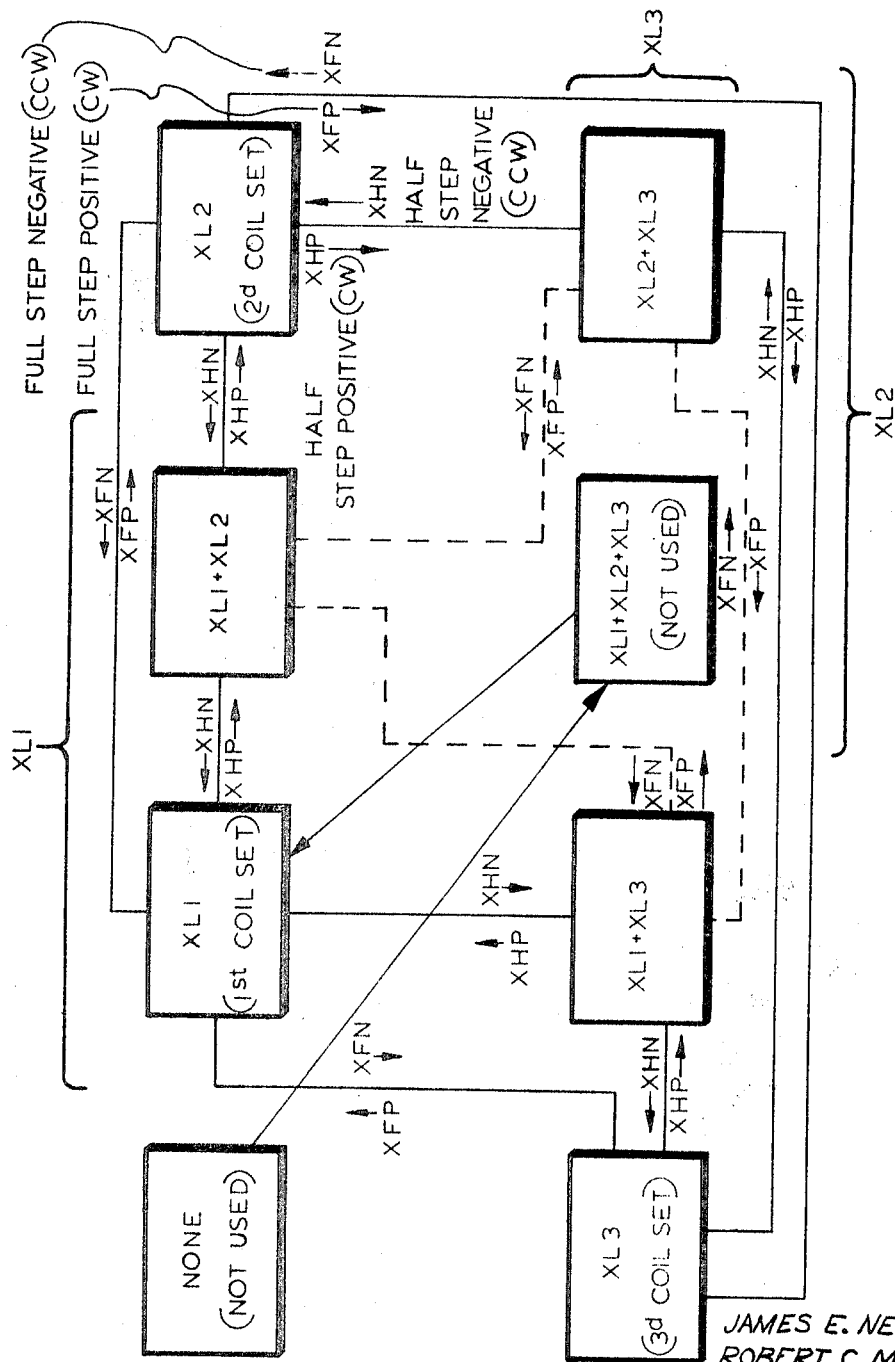
Figure 23:
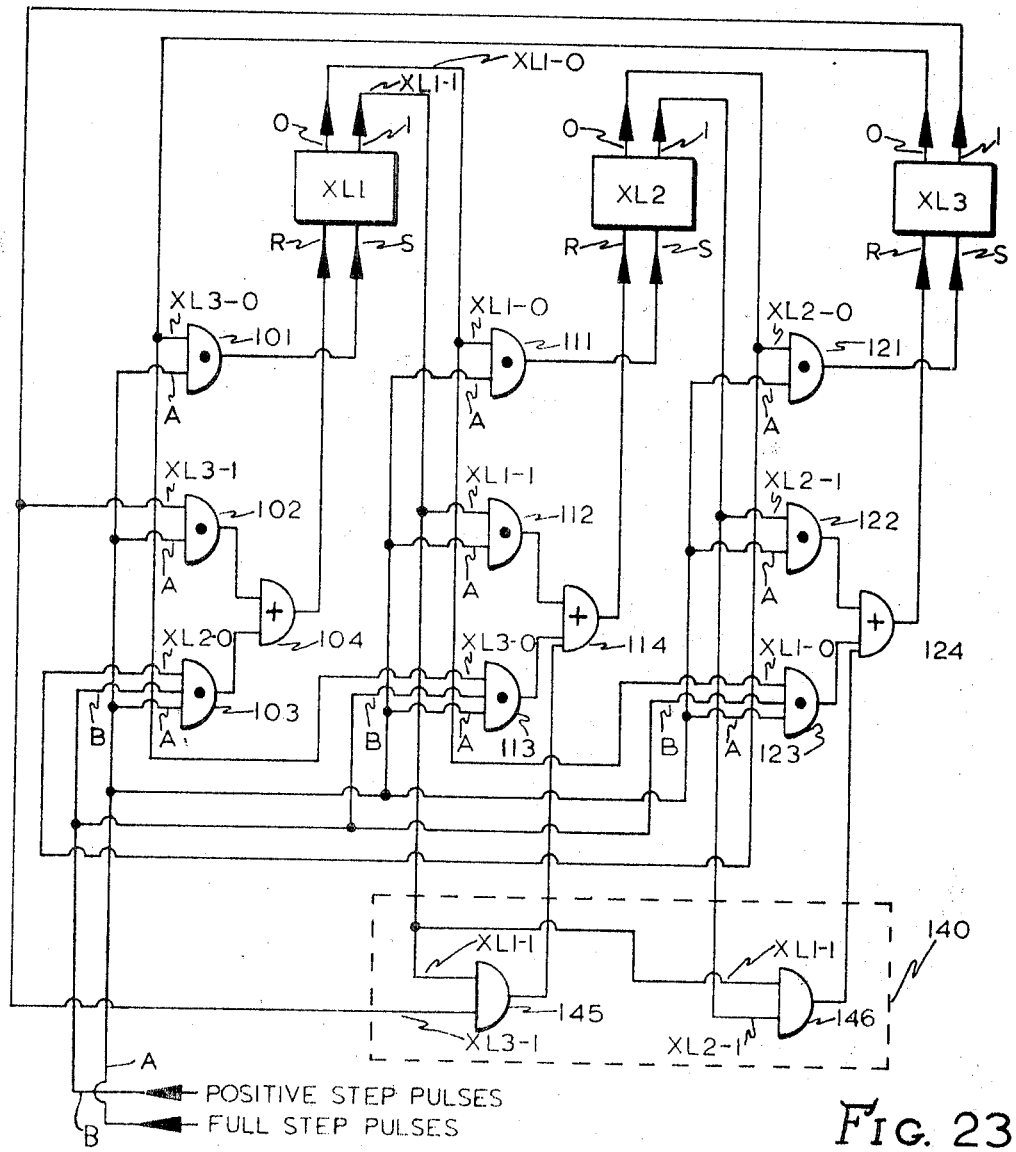
Figure 22:
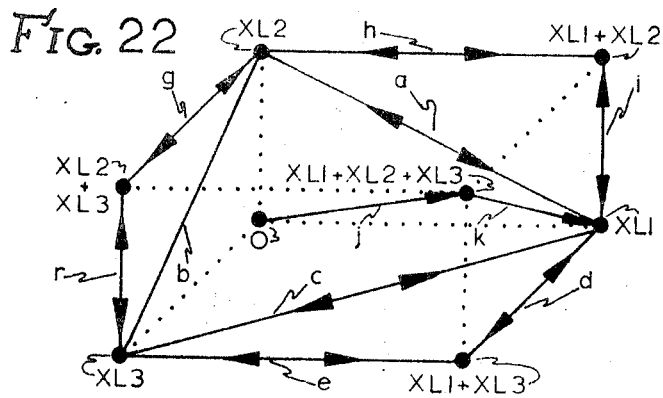
Figure 24:
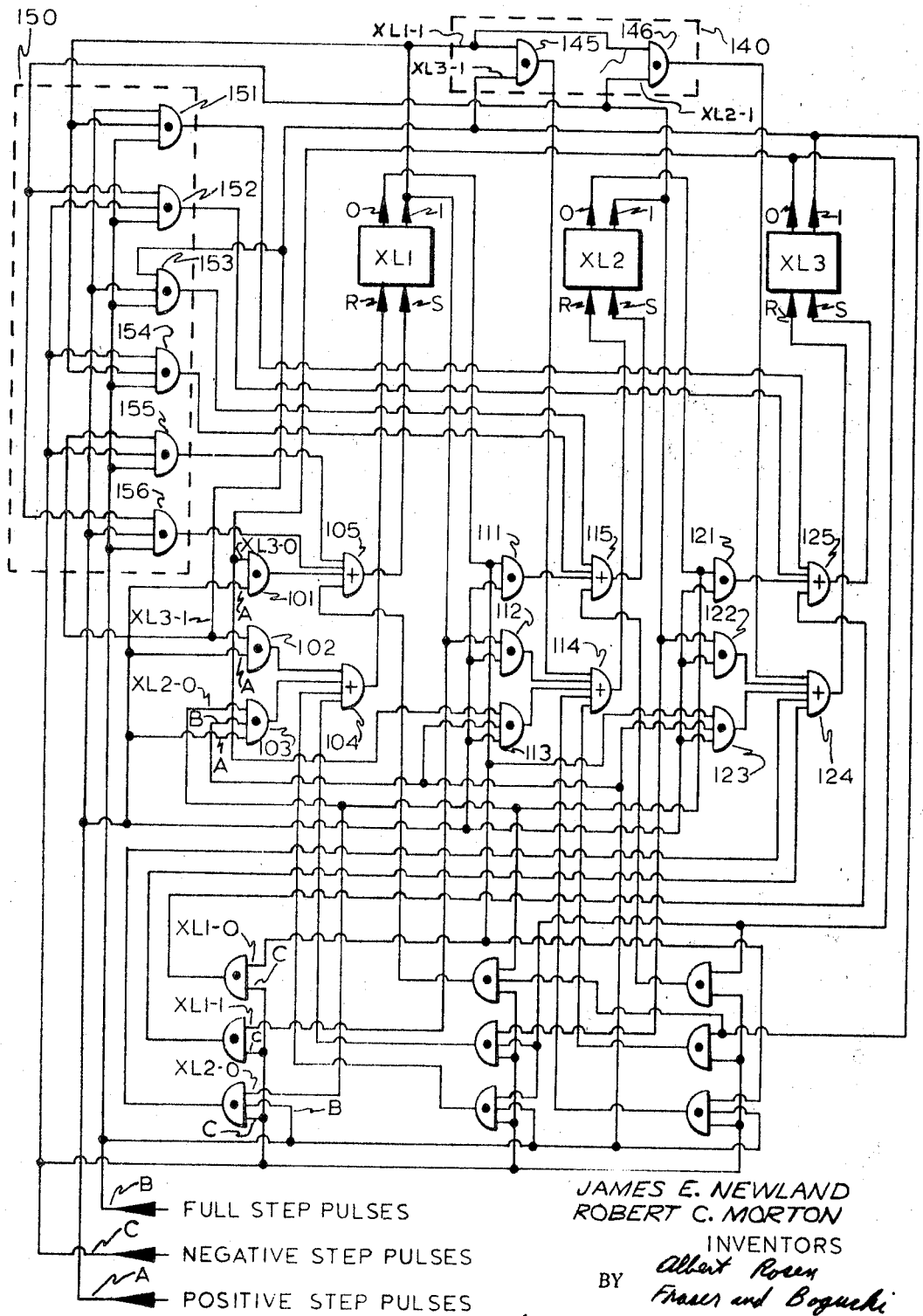

FIG. 15, illustrated on the same sheet of drawing with FIG. 13, is a diagram showing an approximation plotted for a given line segment by the Minimum Plotting Time Method in accordance with the present invention, the approximation plotted in this FIG. 15 being produced through the use of the chart of FIG. 13 and the table of FIG. 14;

FIG. 16 is a diagram illustrating the comparison principles involved in providing a minimum plotting error approximation plot produced in accordance with the invention;

FIG. 17 is a flow chart showing the comparison steps involved in the operation of a digital incremental plotter in accordance with the invention for producing a plot characterized in approximating a given straight line with a minimum plotting error, or least deviation from the desired given straight line;

FIG. 18 is a portion of a table indicating the constants employed in following the flow chart of FIG. 17 in approximating a given straight line;

FIG. 19 is a diagram showing an approximation of a straight line by use of the Minimum Plotting Error Method in accordance with the invention, and produced through the use of the flow chart of FIG. 17 and the table of FIG. 18;

FIG. 20 is a flow chart illustrating the method of analysis and transposition of a given line from the particular semioctant in which the given line is situated, to a common semioctant in which all plotting comparisons and decisions are made;

FIG. 21 is a Veitch diagram of successive stepping-motor-control system states, useful in describing the operation of plotting systems of the invention;

FIG. 22 is a simplified equivalent diagram of the Veitch diagram of FIG. 21;

FIG. 23 is a block diagram illustrating an aspect of the flip-flop control circuits used in a stepping motor control system in accordance with the invention; and FIG. 24 is a block diagram illustrating flip-flop control circuits used to effect the operations depicted in FIGS. 21 and 22.

Plotter stepping motor systems

Stepping motors which have been employed heretofore in digital incremental plotters have been capable of responding to control signals of either polarity so as to produce fixed incremental steps in either of two opposite directions. The various possibilities of movement of a plotter controlled by a pair of such stepping motors, one for each coordinate direction, are shown in the chart of FIG. 1. The resulting eight directions of movement corresponding to $\pm X$, $\pm Y$, or 0 (no motion) are indicated in the table of FIG. 1 and are represented in the diagram of FIG. 2 (zero rotation for both stepping motors results in no movement, and may be considered as a ninth direction). As is clear from FIG. 2, the possible or permitted plotting motion directions occur at multiples of 45° and, therefore, any line being plotted must necessarily be approximated by a series of segments of horizontal, vertical or 45° diagonal lines.

By contrast with the above, arrangements in accordance with the present invention provide for the selective control of X and Y axis stepping motors by command signals equal in magnitude to unity, one-half unity or zero, as indicated in FIG. 3. The number of directions of movement of the plotting mechanism in such a manner in accordance with the invention is increased to 24 (again, zero commands to both stepping motors results in zero movement, and may be considered as a twenty-fifth direction); the foregoing is illustrated in the chart of FIG. 3 and is depicted in vector form in the diagram of FIG. 4. This increased availability of plotting directions materially improves the precision with which a given line to be plotted may be approximated by digital incremental systems in accordance with the invention.

Figure 5:
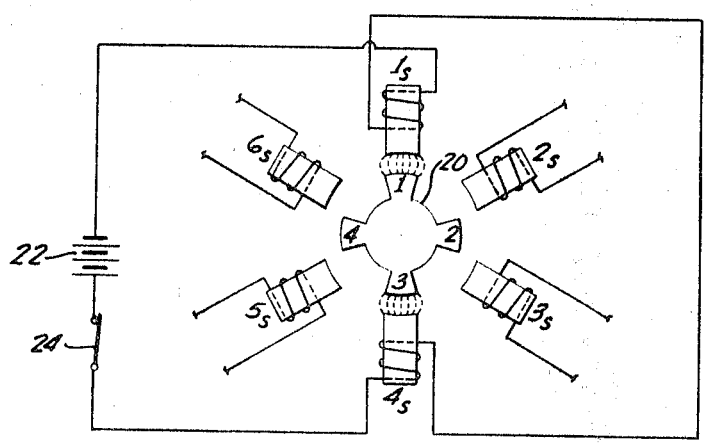
FIG. 5 is a schematic diagram of a stepping motor which may be utilized in a digital incremental plotter in accordance with the invention.

The schematic diagram of FIG. 5 represents a stepping motor which may be utilized in the digital incremental plotter of the invention. The motor of FIG. 5 includes a four-pole, soft iron rotor 20 surrounded by a stator including six coils (numbered 1s through 6s) arranged symmetrically around the rotor 20. The coils 1s–6s are each comprised of a coil of wire wound around a laminated soft iron core. Each coil is electrically connected in series with the coil opposite it, to provide three pairs of coils. Each pair of coils may be separately connected to a power source, indicated schematically as 22, via a switch 24. The complete circuit showing individual power sources and additional switches 32 and 34 is depicted in FIG. 6.

Figure 6:
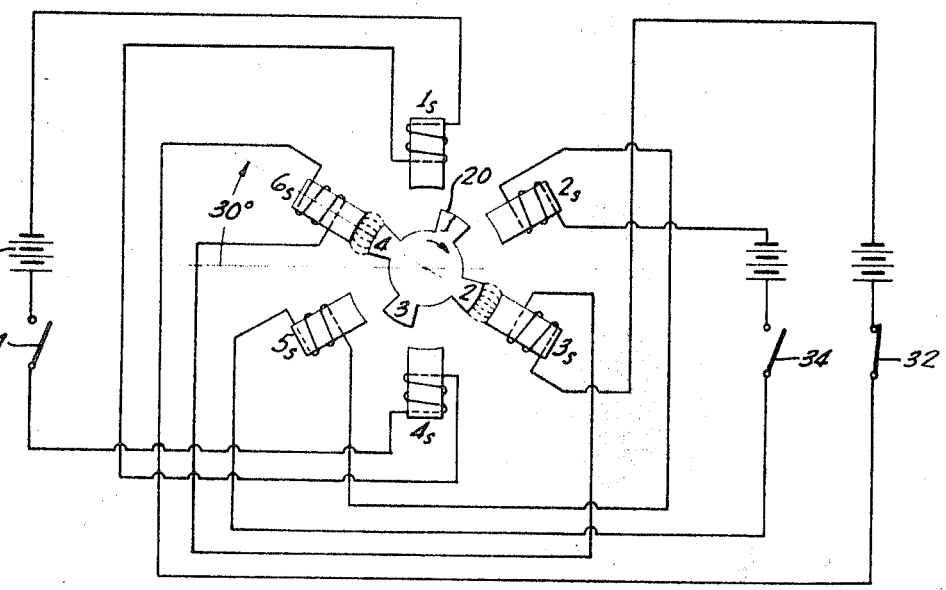
FIG. 6 is a schematic diagram illustrating one particular mode of operation of the stepping motor of FIG. 5.

In operation of the circuits of FIGS. 5 and 6, the rotor 20 is advanced by $\frac{1}{12}$ revolution (30°) each time the coil-energizing-current is switched from one pair of coils to another. For example, with the switch 24 closed (see FIG. 5) to complete a circuit path between the power source 22 and a first pair of opposite coils 1s and 4s, the rotor 20 is aligned with the stator poles wound with these coils 1s and 4s. Thereafter, if the switch 24 is opened and the switch 32 is closed so that another pair of coils 3s–6s becomes the energized pair, the rotor 20 rotates clockwise by 30° to the position shown in FIG. 6, aligning the rotor poles with the newly energized stator poles. Rotation in the counterclockwise sense, from the first position illustrated in FIG. 5, may be realized by closing the switch 34 instead of the switch 32. Thus the direction of rotation is determined by the sequence in which the coils are energized, but each step of rotation involves a 30° shift in position of the rotor 20. It will be understood that the shaft of the rotor 20 is geared by a gear train (not shown) to effect a .01 inch relative motion between a plotting pen and a plotting medium for each 30° rotation of the rotor 20.

In accordance with the invention, circuitry is provided for rotating either or both of the X and Y axis stepping motor rotors, when energized by a suitable command signal, through an angular distance corresponding to either a half or a full plotting step. That is, the step command signals are applied to the stepping motor stator coils in such a fashion that the rotor 20, in the depicted arrangements, is caused to rotate either 30° or 15° at a time, with the result that the ensuing plotting step is either a full step or a half step in the direction controlled by the stepping motor, relative to the fixed increment step heretofore employed.

When, according to the invention, two pairs of stator coils of one stepping motor are simultaneously energized (i.e., four of the six coils are energized), and only one pair of coils was previously energized, the rotor will rotate a distance of 15° from its last position, and assume a position where each of the four rotor poles lies approximately 15° on opposite sides of the energized stator coils. (This position is realized since it minimizes the magnetic reluctance of the path between the energized stator coils and the rotor poles.) This rotor orientation is 15° less than the 30° change in rotor orientation realized when only a single pair of coils is energized at a time, as described above in connection with FIGS. 5 and 6. Thus, if the rotor at one time is oriented in position by the energizing of only one pair of the three pairs of coils, and its position is then changed by the energizing of two pairs of coils simultaneously, the rotor will rotate 15 degrees.

The rotor will rotate 15° every time a rotor position change is effected by energizing two pairs of coils where one pair was energized before, or by energizing one pair of coils where two pairs were energized before. The rotor will rotate 30° every time a rotor position change is effected by energizing a single pair of coils where a different single pair was energized before, or by energizing two pairs of coils where a different set of two pairs of coils were energized before.

Figure 7:
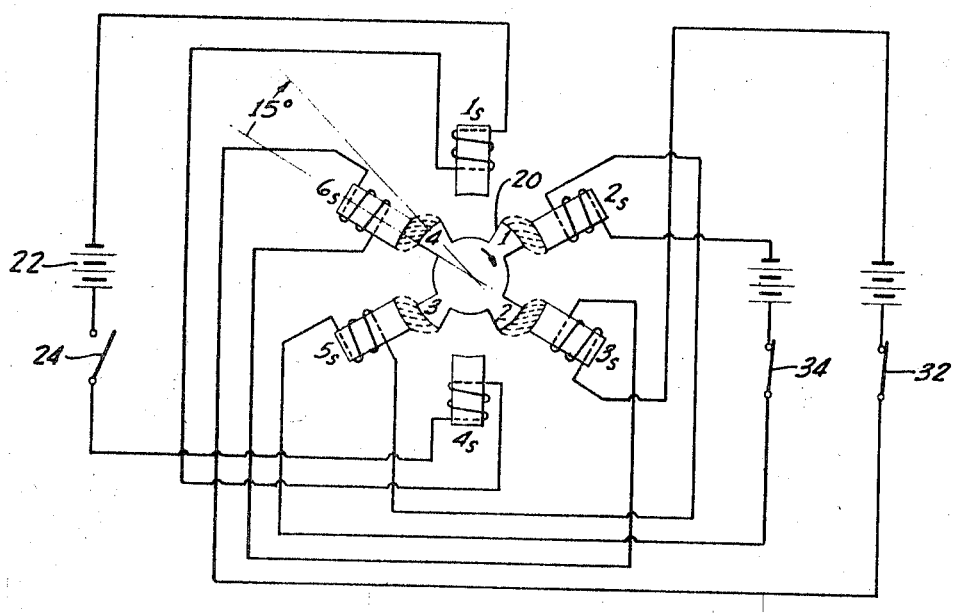
FIG. 7 is a schematic diagram illustrating a second mode of operation of the stepping motor of FIG. 5.
Figure 8:
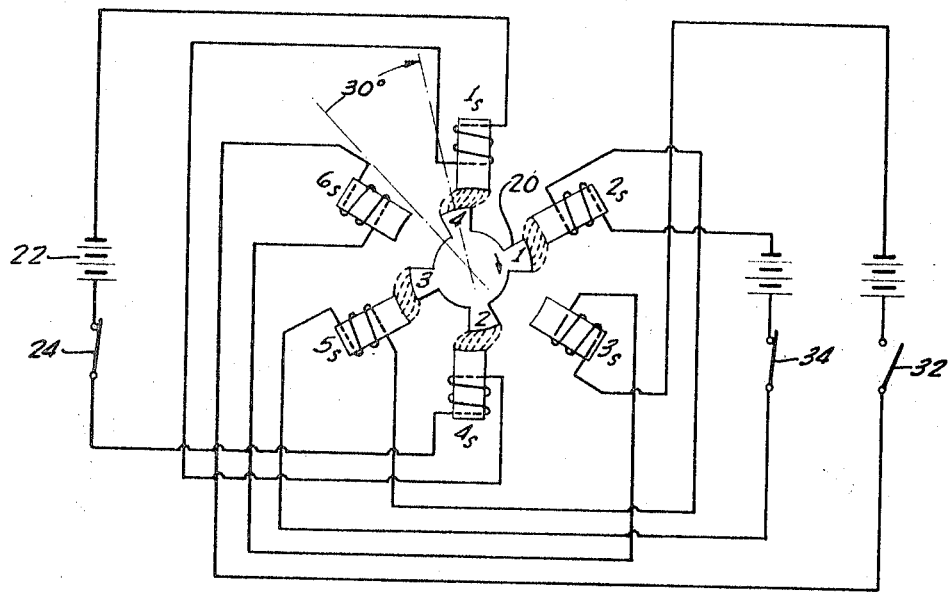
FIG. 8 is a schematic diagram illustrating a further sequential step in the mode of operation represented in FIG. 7.

Referring now to the drawings, the manner by which the foregoing stepping may be accomplished is described in greater detail by a review of FIGS. 7 and 8 which depict the simultaneous energization of two pairs of coils of a single stepping motor. Thus, for example, in FIG. 7 both switches 32 and 34 are closed. (In the previous step motor position only one switch was closed.) The magnetic field generated by the energized pairs of coils 2s–5s and 3s–6s is shifted so that the rotor 20 is rotated by 15° from its previous, FIG. 6 position. If the switch 32 had instead been opened while the switch 34 remained closed, the rotor 20 would have rotated an additional 15°, or a total of 30°, in the clockwise direction. However, if at the time the switch 32 is opened, the switch 24 is closed while the switch 34 remains in its closed position, two pairs of coils 1s–4s, 2s–5s are energized and cause the rotor 20 to rotate a full step of 30° from the previous position (contrast FIG. 8 with FIG. 7). It will thus be apparent that a full step of 30° rotation results when the coil switches are operated to energize the same number of coils as were energized for the previous rotor position (i.e., a change from one single pair of energized coils to another single pair of energized coils, or a change from one set of two pairs of energized coils to another set of two pairs of energized coils). Similarly, a half step rotation of 15° results when the switches 24, 32 and 34 are suitably manipulated to energize two pairs of coils where one was energized previously or to energize a single pair of coils where two pairs were energized previously. Accordingly, by purely electronic control of the stepping rotor in accordance with the invention, either half step or full step rotation (and corresponding movement of the associated plotting mechanism) may be selectively achieved from the same stepping motor without resort to additional gearing arrangements.

While the arrangement of the invention has been described with respect to stepping motors having a 4-pole rotor and a 6-pole stator, it will be appreciated that other combinations of rotor and stator pole configurations may instead be used in practicing the invention. Thus, for example, the stepping motor may instead take the form of an 8-pole rotor surrounded by a 12-pole stator, and with oppositely oriented stator poles each wound with a coil in a series or parallel connector with its opposite pole. In such a case a full-step energization would effect a stepping motor step of 15 degrees, and a half-step energization would effect a step of 7½ degrees.

Line approximation through use of stepping motors

Figure 9:
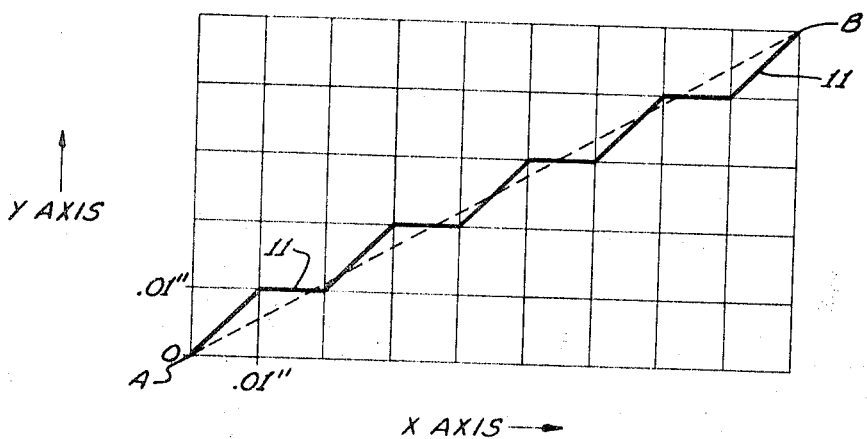
FIG. 9 is a diagram illustrating a straight line approximation produced by a presently used digital incremental plotter having fixed stepping increments.
Figure 10:
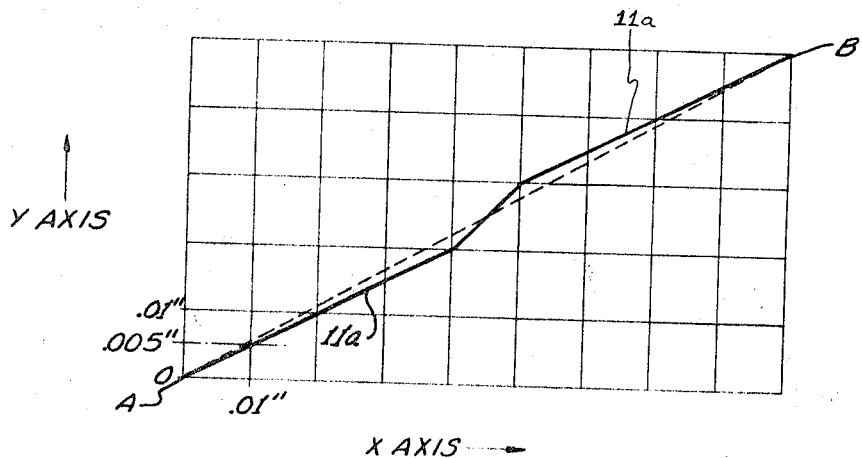
FIG. 10 is a diagram illustrating a plot of the same straight line approximation produced in accordance with the present invention.

Control of the stepping motor of a digtial incremental plotter as described above materially improves the appearance and accuracy of a line approximation plotted to follow a particular line, as may be seen from a comparison of the plots of FIGS. 9 and 10. In these figures the same dashed line A–B is approximated by the solid line segments extending from A to B and designated 11 in FIG. 9, and designated 11a in FIG. 10. The approximation 11 of FIG. 9 is plotted by a plotter which has only full step capability in plotter movement. As a result, a jagged sawtooth waveform is produced which is much less desirable than the nearly straight line approximation 11a shown in FIG. 10, drawn by a plotter having a capability of stepping motor advance by either half step or full step increments as appears appropriate. The approximation 11a of FIG. 10 is plotted with the same speed as the approximation 11 of FIG. 9, since the X axis stepping motor is continuously stepped in full size increments with the Y axis stepping motor being driven in half step increments for the major part of the smaller Y axis movement.

It will be understood that the control of a digital incremental plotter to approximate a line to be plotted in this manner involves an analysis of the line coordinates in order to select a particular one of a number of optional or alternative approximations to the line. In particular, this analysis may be involved in the optimizing of a given plotting parameter, perhaps at the expense of other factors. For example, it may be desired to approximate a given straight line segment in a minimum plotting time or, alternatively, with the minimum plotting error or with the least deviation from the line being plotted. In general, the plotting of a line in a minimum time does not result in the least deviation from the plotted line. Accordingly, a selection must be made of a particular method which it is decided to employ. The following description sets forth particular methods in accordance with the invention for approximating a line by a digital incremental plotter utilizing the concept of selective half step, full step control of the X and Y axis stepping motors in accordance with the invention.

Referring to FIG. 9, consider a standard fixed step-size plotter called upon to draw a line between points A and B. Such a fixed step size plotter can draw a line at 0° (i.e., motion in the X direction only), it can draw a line at 90° (i.e., motion in the Y direction only), or it can draw a line exhibiting a combined X and Y axis motion to provide a line at 45°. The line A–B is at an angle of some 35°; thus the plotter would be directed (e.g., by a general purpose computer to which it is connected) to make a series of 0° and 45° plot lines, producing the sawtooth plotted line 11 approximating the ultimately desired line A–B.

Now, referring to FIG. 10, the same straight line A–B is approximated by a plotter employing the present invention. The line 11a is produced by the plotter of the invention since this plotter is capable of moving a full step in an X direction while moving a half step in the Y direction. Since the overall plotting speed is here a function of the speed along the X axis, the fact that stepping along the Y axis is sometimes in half-Y steps does not slow the plotter down. However, the resultant line is seen to be appreciably smoother.

Figure 11:
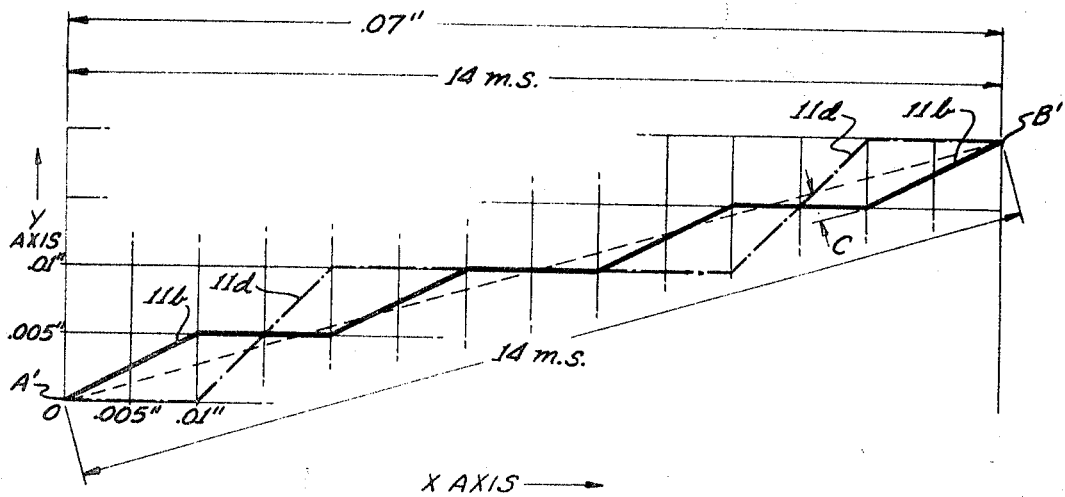
FIG. 11 is a diagram showing details of a straight line approximation by the Minimum Plotting Time Method in accordance with the invention.
Figure 12:
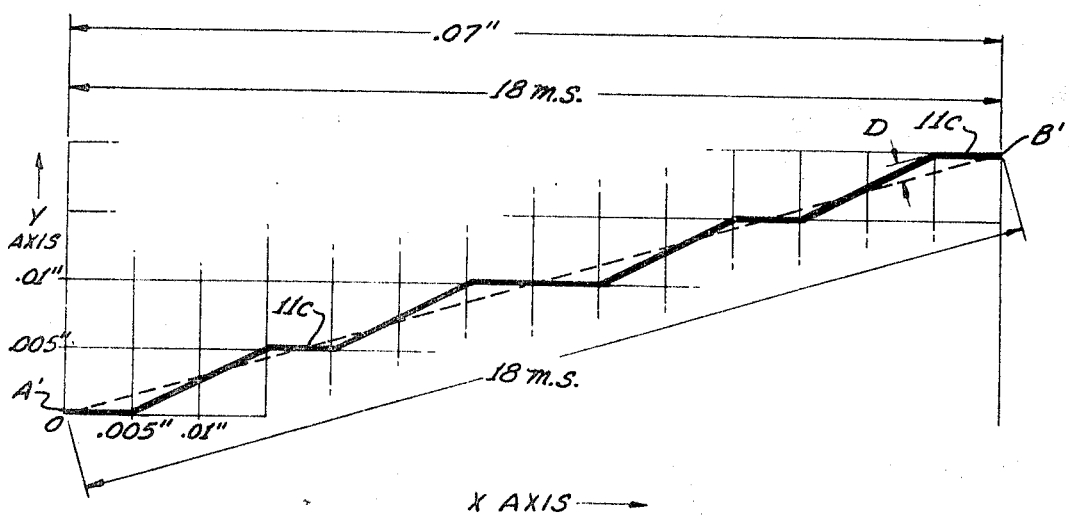
FIG. 12 is a similar diagram illustrating an approximation plotted by a Minimum Plotting Error Method in accordance with the invention.

Referring to FIGS. 11 and 12, line A–B represents the straight line to be approximated by a digital incremental plotter. As has been explained above, the digital incremental plotter is capable of making either half- or full-sized steps along the X and Y axes in a choice of 24 combinations (the particular combinations available being illustrated in FIG. 4). The plots depicted in FIGS. 11 and 12 are assumed to have been made by a plotter capable of making line increment steps of both .01″ and .005″ at a speed of 500 steps per second regardless of step size. Consequently, the plotter takes 2 milliseconds to describe one step regardless of whether the step size is a half step (.005″) or a full step (.01″).

In the approximation of line A–B by the plotter, two alternatives are available: the line A–B may be approximated by directing the plotter to select step size and step direction combinations to produce the plot with a minimum plotting time (illustrated in FIG. 11 and explained below in detail in connection with the method depicted in connection with FIGS. 13, 14 and 15); alternatively, the plotter can be driven to approximate the line A–B with a minimum plotting error (illustrated in FIG. 12, and explained in detail in connection with FIGS. 16, 17 and 18).

If the plotter is directed to use a minimum plotting time, the distance A–B to be plotted is first examined to determine the greater of the X and Y distances (the X distance is greater in FIG. 11), and the plotter is then directed to make full steps only until the plot is finished, and to make a half step only as necessary at the end of the plot to make the plot come out even. Simultaneous stepping in the Y direction, along with that in the X direction, is controlled to provide either half or full steps to best approximate the line to be plotted. Thus, the dashed line of approximation 11b would take 14 milliseconds to draw, and would involve a succession of seven full X-axis steps. Y-axis stepping would occur at the rate of a half-step along the Y axis during the execution of the first X-axis full-step, followed by an alternate succession of no motion and half-step motions along the Y axis during successive X axis full-sized steps. The maximum approximation error of the resultant plot of line 11b is indicated at the letter C; this maximum plotting error is approximately ¼ step or .0025″. The minimum plotting time of 14 milliseconds is achieved and is determined by the time needed to traverse the X axis distance (.07″ at 2 milliseconds per .01″).

FIG. 12 illustrates a method of operating the plotter to produce the same straight line plot A–B, but with the plotter step size and step direction combinations selected to provide minimum plotting error, instead of minimum plotting time as in the example of FIG. 10. As illustrated in FIG. 12, the plotted line 11c makes a maximum deviation from the ideal line A–B of approximately ¼ of a half-step or a .00125″ error, as indicated at the letter D. In the plot of FIG. 12, the X-axis distance of .07″ takes 18 milliseconds to draw; thus, plotting accuracy is increased at the expense of plotting speed.

Where minimum plotting error (example of FIG. 12, and later in connection with FIG. 18) is selected as against minimum plotting time (FIG. 11), the worst-case situation (i.e., greatest plotting time) occurs when the longer axis distance to be drawn involves alternate half and full steps (as compared to an operation selected for minimum plotting time, which would involve the use of only full steps along the longer axis to be plotted). In this worst-case situation the plotting speed would be ⅔ of the plotting speed selected to provide minimum plotting time.

Straight line approximation—minimum plotting time method

The straight line approximation method of the type depicted in FIG. 11 as producing line 11b (which approximates line A′B′) will now be discussed in greater detail to describe the plotting method involved. As has been indicated above, this straight line approximation method provides the approximation in a minimum of plotting time. By minimum plotting time, the following is meant: After comparing the maximum distance to be plotted in the X direction with that in the Y direction (i.e., the greater of the absolute X and absolute Y valves), the plotter is operated to plot only full-size steps in the greater of the X or Y axis directions. (A single half-size step may be added in this greater of the X or Y axis directions if the total distance in this direction would be better approximated by such an addition.) Straight lines which are not parallel to a basic plotting direction (i.e., one of the 16 basic plotting directions depicted in FIG. 4) must be approximated by a series of fixed-size, linear, incremental pen movements, each movement in one of the basic plotting directions.

The following straight line algorithm illustrates a desirable routing using one approximation method for digital incremental plotting. The problem is to approximate a straight line between any two points using fixed-size plotting increments. The increments can take the form of $\pm X$ or $\pm Y$ steps, $\pm X/2$ or $\pm Y/2$ steps, or any combination of the X and Y steps.

In solving the straight line approximation prolem, that is, in determining the desired series of X and Y axes steps required to provide the desired straight line approximation, a number of operations are involved. First, the required quadrant of direction must be found, and then the required octant. (Referring to FIG. 4, the various directions depicted may be considered to define boundaries of eight octants: The area defined between the direction lines X and X,Y is hatched in FIG. 4 as areas C and D; the other seven octants are defined, respectively, between the direction lines X and X,—Y; X,—Y and —Y; —Y and —X,—Y; —X,—Y and —X; —X and —X,Y; —X,Y and Y; and Y and X,Y.) The flow chart of FIG. 13 illustrates a sequence of comparison and selection operations employed to select the desired series of incremental plotting steps. While the required comparison and selection operations may be realized in a number of different manners, it is here assumed that the operations will be accomplished in a digital, analog, or hybrid computer of either a special purpose or a general purpose variety. For example, a general purpose digital computer may be used, of the kind commonly referred to as the IBM 1620, manufactured by the International Business Machines Corporation of Poughkeepsie, N.Y.

In the development of the plotter control signals for a given line segment, it is necessary to determine the true direction of the segment relative to a reference origin. This is done by dividing the 360° of azimuth into sixteen semioctants (see FIG. 4) and ascertaining which semioctant contains the like segment to be plotted by one of the approximation methods here described. Details of the steps employed in determining line segment direction are set forth below in conjunction with the description of FIG. 20. In brief, the process involves the development of transposition constants to rotate the line segment from an assumed semioctant in which both X and Y are positive with $X \geq 2Y$. Thus, the chart of FIG. 13 and the following discussion assumes that the line to be approximated lies within a given semioctant, for example, the semioctant D of FIG. 4 (that is, between the directions X and X, Y/2). In the event the line to be approximated lies in any other semioctant, the associated X and Y values are treated as if they lay in this semioctant D, the required sequence of plotting steps is then selected, and then the selected X and Y steps are each transposed to the equivalent of this selected semioctant D. The transposition can be accomplished by multiplying the associated X and Y values for each of the other semioctants A through C and E through P by appropriate transposition constants peculiar to that particular semioctant. Thus, for example, if the line to be approximated is determined to lie within semioctant A, the sequence of plotting steps to be taken to approximate the line is first determined using the absolute values of X and Y (disregarding the sign of the actual values). Then, after the sequence of plotting steps is determined, each X and Y value is multiplied by a transposition constant peculiar to semioctant A, converting these X and Y values to corresponding values in the A semioctant.

FIG. 4 illustrates the movements available to approximate the straight line A″B″ of FIG. 15. In FIG. 15, the distance to be plotted in the X direction ($\Delta X$) is assumed to be greater than the distance to be plotted in the Y direction ($\Delta Y$). The straight line A″B″ is approximated by X and Y axis motions in fixed value increments of either IS, full steps, or IS/2, half steps. (The symbol IS refers to a full step movement along one of the X or Y axes; the symbol IS/2 refers to a half-step movement along either of these axes.)

In approximating line A″B″ of FIG. 15, it is here assumed that the approximation is to be accomplished in a minimum time. Thus, the increment value along the X axis, the greater direction axis, is always a full X step. Each X step will be be accompanied by either a half step, Y/2, along the Y axis, or no step along the Y axis. (It is noted that in semioctant D, values along the Y axis are always between 0 and Y/2, and the value along the X axis is always a full step X. For other semioctants, the transpositions referred to will yield the ultimately required $\pm X$, $\pm X/2$, $\pm Y$, and $\pm Y/2$ values.)

The Y value of the line A″B″ after N steps may be computed as: $Y_N = X_N(\Delta Y / \Delta X)$ (beginning from a zero reference). Since the maximum stepping movements along the Y axis can only be in increments of the length IS/2, half steps, the evolution of this equation can be used as a decision to execute Y movements (i.e., whether to execute a half step [Y/2], or no movement along the Y axis, during each successive full step X movement). The basis for decision on when to execute a combined X and Y/2 movement, or only an X movement, depends on when the line to be approximated exceeds one-fourth of a full step in the Y direction ($IS \div 4$). The decision, which is the subject of the least time approximation flow chart of FIG. 13, may be considered to be as follows:

When $$\sum_{0}^{N_x} IS\left(\frac{\Delta Y}{\Delta X}\right)$$

exceeds $$\tfrac{3}{4}(IS) + \sum_{0}^{N_y} IS$$

then a combined X and Y/2 movement is required to be executed. If $$\sum_{0}^{N_x} IS\left(\frac{\Delta Y}{\Delta X}\right)$$

is equal to or less than $$\tfrac{3}{4}(IS) + \sum_{0}^{N_y} IS$$

then only an X step movement is required to be executed. ($N_x$ refers to the total of the number of half-step increments already executed along the X axis, and $N_y$ to the total number of half-step increments already executed along the Y axis.)

The foregoing comparison may be simplified to the expression $$\sum_{0}^{N_x} \Delta Y - \sum_{0}^{N_y} \Delta X > \tfrac{3}{4} \Delta X \qquad (1)$$

for a combined X and Y/2 movement, and $$\sum_{0}^{N_x} \Delta Y - \sum_{0}^{N_y} \Delta X \leq \tfrac{3}{4} \Delta X \qquad (2)$$

for a full step, X movement only.

The successive operations in the approximation of line A″B″ in FIG. 15, to produce the actually plotted line 11e, will now be described. Reference is now made to the table of FIG. 14, which lists each of the operations of the chart of FIG. 13 as applied to the line A″B″ of FIG. 15.

In the table of FIG. 14, the term "sequential step" applies to the first column and lists, by number, the successive operations involved.

The term "flow chart step" applied to the second column of FIG. 14 lists the step on the flow chart of FIG. 13 that is being accomplished.

The term "NT" applied to the third column of the table of FIG. 14 refers to a constant: the numerical total of half steps (to the nearest half-step) in the major (X) direction in the line to be approximated. Thus the term NT is the same for every entry in the third column.

The term "NR" at the head of the fourth column also refers to a constant: the total number of half steps (to the nearest half step) in the minor (Y) direction in the line to be approximated. Thus the term is the same for every entry in the fourth column and for convenience is there listed as 2(NR).

The term "NC" at the head of the fifth column refers to the numerical count or total number of half steps yet to be plotted in the major (X) direction at the particular time under consideration. Since a least time approximation involves the plotting of a full step (i.e., a distance equal to 2 half steps) at every successive plotting time, the numerical count of half steps yet to be plotted in the major direction will decrease by 2 each time a plotting step is executed. (If NC is equal to 1 at the next-to-final plotting step, a single half step will be plotted to complete the least time approximation.)

The term "NA" at the head of the sixth column of the table of FIG. 14 refers to the ideal or actual distance, in the minor (Y) direction, along the line A″B″ to be approximated, one full X step beyond the instant in time under consideration. This term NA also refers to the evaluation of the portion of Equation 1 above that is to be left of the inequality sign. A half-step (Y/2) is to be plotted in the minor direction whenever NA (the Y value along the line A″B″ at the location one full X step beyond the last step actually plotted) exceeds the Y value last plotted by more than one-fourth step.

The term "NA" may be considered in terms of a variable whose value is initially equal to one-half of the absolute value of $\Delta X$, or $|\Delta X/2|$. Thus, for example, the starting value of the term NA is taken as $|\Delta X/2|$. This value of NA is then first increased by twice the absolute value of NR, or $2|\Delta Y|$, during each cycle (through Step 2) of the flow chart of FIG. 13. Then (Step 3 in the flow chart) this increased or intermediate value of NA is compared with NT, the number of half steps in the X direction. If the intermediate value of NA is now less than NT, then (Step 4) only a full X step movement is executed and this intermediate value of NA will be the basis for the next cycle; however, if the intermediate value of NA is now equal to or greater than NT, then (Step 5) this intermediate value of NA is decreased by the absolute value of $|\Delta X|$ to provide a new value for NA, and then (Step 6) a combined plotting movement is executed, the combined movement consisting of the simultaneous plotting of a full step in the X direction and a half step in the Y direction (X, Y/2).

In the next step of the flow chart (Step 7), the value NC, the total number of half-steps yet to be plotted in the X direction, is decreased by 2. This new value of NC is then compared with 1 (Step 1) where the cycle is repeated if the value of NC is greater than 1. If the value of NC is equal to 1, then a single half-step is plotted in the X direction; if the value of NC is less than 1, then the plotting operation is terminated.

The term "Decision" at the head of the seventh column of the flow table of FIG. 14 refers to the decision to be made at the point in time under consideration as to the flow chart direction to be followed. The decision listed in this column 7 refers to the flow chart step in column 2 in the same line of the table. Finally, the term "Movement," appearing at the head of the eighth column of the table refers to the plotter motion to be executed at the end of the sequential step considered. Where no entry appears in the "Movement" column, the sequential step is entered into without any motion of the plotter.

Referring to the line A″B″ of FIG. 15, the initial step in the plotter movement calculation will now be considered. Referring to the Initial sequential step in the table of FIG. 14, it will be noted that, for the line A″B″, $NT=22$; $2(NR)=12$; $NC=22$; and the initial value of NA or $|\Delta X/2|=11$. The Decision and Movement columns are blank since no decisions or motions of the plotter are effected at the initiation of the comparison.

The sequence of operations listed in the flow table of FIG. 14 is then followed, using the chart comparisons called for in FIG. 13, with the end result that the plotting motions called for in the "Movement" column of the table are executed, in the sequence listed, to effect the plotting of the line 11e in FIG. 15.

As indicated above, the Minimum Plotting Time Method of straight line approximation results in the making of plots in less time than the use of the Minimum Error Method described below.

Straight line approximation—minimum plotting error method

The straight line approximation method, of the type depicted in FIGS. 12 and 19, as producing lines 11c and 11f, respectively, will now be discussed in greater detail to describe the Minimum Plotting Error Method involved. As described above in connection with the Minimum Plotting Time Method, the straight line algorithm involves the approximation of a straight line between two points using fixed-size plotting increments. The increments can take the form of $\pm X$ or $\pm Y$ steps, $\pm X/2$ or $\pm Y/2$ steps, or any combination of these steps.

In determining the desired series of X and Y axes steps required to provide the desired approximation, the required semioctant (A through P of FIG. 4) is first determined. A more detailed description of the method of determining the particular semioctant containing the desired straight line will be discussed below in connection with FIG. 20.

As has been described previously with respect to the Minimum Plotting Time Method, the Minimum Plotting Error Method also assumes that the line to be approximated lies within a given sector (for example, the semioctant D; that is, between the directions X, Y/2). In the event the lines to be approximated lie in any other semioctant, the associated X and Y values are treated as if they lay in this semioctant D, the required sequence of plotting steps is then selected, and then the selected X and Y steps are each transposed to the equivalent of this semioctant D. For purposes of the following discussion, it is assumed that the line to be approximated lies with semioctant D. Thus, the values along the Y axis are always between 0 and $Y/2$, and the values along the X axis are always between 0 and X. Since, by definition, the total length of the line along the X axis is assumed to be greater than that along the Y axis, each plotting step will involve either an $X/2$ step or a full X step. At the same time, the plotter will execute either a 0 or a $Y/2$ step in the Y direction. Thus, the permissible stepping combinations in semioctant D are: $X/2$; X; and $X,Y/2$.

Reference will now be made to FIGS. 16 and 19 in illustrating the discussion of the Minimium Plotting Error Method. It will be noted that the plotter, in approximating the straight line 11f, has a choice at any given instant in time of describing an X step, an $X/2$ step, or a combined $X,Y/2$ step. The particular choice will depend upon which plotting direction will give the closest approximation. Referring to FIG. 16, it will be noted that if the plotter pen, at a given instant in time, is at point 0, and the line 11f to be approximated does not exactly coincide with any of the basic plotting directions, the plotter can have the following choices: it can describe an $X/2$ step followed by an $X,Y/2$ step (describing lines OC and CB); it can describe an X step (line OD); or it can start out by decribing an $X,Y/2$ step (line OA). The problem is to decide which of these three courses of action will provide the least deviation from the line A″B″ to be approximated.

As illustrated in FIG. 16, the maximum distances of the actually plotted line from the line A″B″ to be approximated, at the end of each of the foregoing stepping choices, are: for an X step, the distance FD; for a combined $X,Y/2$ step, the distance AF; and for the successive $X/2$ and then $X,Y/2$ steps, the respective distances EC and BG. The best or most desirable choice is then the one which selects the smallest of distances FD, AF, EC, and BG. The following comparisons must thus be made: the distance EC is first compared with distance BG. The greater of the two distances EC and BG is then compared with the distance AF and then with the distance FD. If the $EC=BG$, an arbitrary choice of one is made for comparison with AF and FD. If AF is less than FD and is also less than the greater of the two distances EC and BG, then the plotting motion $X,Y/2$ is selected. If FD is less than AF and is also less than the greater of the two distances EC and BG, then the plotting motion X is selected. However, if the greater of the two distances EC and BG is less than the distance AF and is also less than the distance FD, then the plotting motion $X/2$ is selected.

The Least Deviation Approximation flow chart of FIG. 17 provides these comparisons for the Minimum Plotting Error Method. In FIG. 17, the distance AF is designated by the term N1, the distance FD by the term N2, the distance EC by the term N3, and the distance BG by the term N4.

The total X distance to be ploted is referred to as $\Delta X$, and the total Y distance to be plotted is referred to as $\Delta Y$. The slope of the line A″B″ is thus determined by the ratio of $\Delta Y$ to $\Delta X$. Geometrically, then, the ratio of $\Delta Y$ to $\Delta X$ is the same as the ratio of the distance EC to CO, which in turn is the same as the ratio of the distance EC to CO, which in turn is the same as the radio FD to DO, which in turn is also the same as the ratio GH to HO.

In order to establish the magnitude and direction of the plotter steps to be used to described line 11f to approximate line A″B″ of FIG. 19 by the Minimum Plotting Error Method, the relative values of lines EC, BG, AF, and FD (FIG. 16) are established for any point along the line A″B″ to be approximated.

Firstly, by definition:

$$OC = \frac{OD}{2} = \frac{OH}{3} = AD = BH$$

(the distances OC, CD, DH, AD, and BH, are equal to each other, and each is equal in value to a half-step in either the X or Y direction).

The total number of X half-steps is $|\Delta X|$, and the total number of Y half-steps is $|\Delta Y|$. Then the distance EC is to $|\Delta Y|$ in the same proportion as distance OC is to $|\Delta X|$, or:

$$\frac{EC}{|\Delta Y|} = \frac{OC}{|\Delta X|}$$

Similarly, as respects distances FD and OD:

$$\frac{FD}{|\Delta Y|} = \frac{OD}{|\Delta X|} = \frac{2(OC)}{|\Delta X|}$$

and as respects distances GH and OH:

$$\frac{GH}{|\Delta Y|} = \frac{OH}{|\Delta X|} = \frac{3(OC)}{|\Delta X|}$$

By means of the foregoing, the values are found for the distances AF, FD, EC, and BG, namely:

$$AF = OC - \frac{2(OC)}{|\Delta X|}(|\Delta Y|)$$

$$FD = \frac{2(OC)}{|\Delta X|}(|\Delta Y|)$$

$$EC = \frac{OC}{|\Delta X|}(|\Delta Y|)$$

$$BG = OC = \frac{3(OC)}{|\Delta X|}(|\Delta Y|)$$

In order to express each of the foregoing quantities AF, FD, EC, and BG, solely in terms of the total X distance ($|\Delta X|$) and the total Y distance ($|\Delta Y|$), both sides of each of the latter four equations are multiplied by the quantity $|\Delta X/OC|$. This multiplication yields the following relative proportions:

$$AF \sim |\Delta X| - 2|\Delta Y| = N1$$
$$FD \sim 2|\Delta Y| = N2$$
$$EC \sim |\Delta Y| = N3$$
$$BG \sim |\Delta X| - 3|\Delta Y| = N4$$

The term N1 refers to distance AF, the term N2 refers to distance FD, the term N3 refers to distance EC, and the term N4 refers to distance BG. These terms will be employed directly in performing the sequential comparisons of distance.

The comparison operations previously discussed with respect to FIG. 16 are then carried out to determine the choice of successive plotter step motions. This series of comparisons is illustrated in the Least Deviation Approximation chart of FIG. 17, and the table of FIG. 18.

The table of FIG. 18 lists the first several operations of the chart of FIG. 17 as applied to the line 11*f* of FIG. 19. In the table of FIG. 18, the term "Sequential Step" applies to the first column and lists by number the successive operations involved.

The term "FIG. 17 flow chart step" applied to the second column lists the step on the flow chart of FIG. 17 that is being executed.

The term "NK" at the head of the third column of FIG. 18 table refers to the numerical count or total number of half steps yet to be plotted in the major (X) direction at the particular time under consideration. Since at least plotting error approximation involves the plotting of either a half step or a full step (a distance equal to two half steps) at every successive plotting time, the numerical count of half steps yet to be plotted in the major direction will decrease by one each time a half step is plotted, and will decrease by two each time a full plotting step is executed. When the term "NK" is equal to one, only a half step remains to be plotted in the major direction. When NK equals zero, the entire major direction distance has been plotted, and the plotting of the approximation is ended.

The term "NH" at the head of the fourth column of FIG. 18 refers to the greater of the distances EC or BG referred to in FIG. 16. After these two distances (EC and BG) are compared with each other (Step 2 in FIG. 17) the larger of these two distances is represented by the term "NH" in order that the comparisons described above may then be carried out. The term "K" at the head of the fifth column refers to a constant that is used after the execution of any plotting step to adjust the value of quantities "N1" through "N4" to those applicable to the new plotter pen position. The terms "N1" through "N4" refer, respectively, to the distances AF, FD, EC, and BG, of FIG. 16, as indicated above.

The term "Decision" at the head of the tenth column refers to the decision to be made at the point in time under consideration as to the flow chart direction to be followed. The decision listed in this column 10 refers to the flow chart step in column 2.

Finally, the term "Movement," appearing at the head of the eleventh column refers to the plotter motion to be executed at the end of the sequential step considered. Where no entry appears in the "Movement" column, the next sequential step is entered into without any motion of the plotter.

Referring to the line A″B″ of FIG. 19, defined by the points A″ and B″, the initial step in the plotter movement calculation will now be considered. By reference to the initial sequential step in the table of FIG. 18, it will be noted that, for the line 11*f* to be plotted, $NK = |\Delta X|$ or 22; no values are yet entered for values NH or K, $N1 = |\Delta X| - 2|\Delta Y|$ or 10; $N2 = 2|\Delta Y|$ or 12; $N3 = |\Delta Y|$ or 6; and $N4 = |\Delta X| - 3|\Delta Y|$ or 4. The Decision and Movement columns are blank since no decision or motions of the plotter are effected at the initiation of the comparison.

The sequence of operations listed in the flow table of FIG. 18 is then effected, the first ten sequential steps being illustrated in FIG. 18, with the end result that the plotting motions called for in the "Movement" column of the table are executed to effect the plotting of line 11*f* in FIG. 19.

Selection of semioctant transformation constants

In the straight line approximation methods described, the lines to be approximated have been assumed to lie within a given semioctant sector, for example the semioctant D. In actuality, the real semioctant containing the desired line to be approximated may in fact be any one of the other fifteen semioctants.

The flow chart of FIG. 20 illustrates the method of determining the semioctant containing the line to be approximated, and establishes a transformation code peculiar to that semioctant. After the straight line approximation operation of either FIG. 13 or FIG. 17 has been accomplished, the resultant plotter motions are transformed by the appropriate transformation codes peculiar to the real semioctant containing the line to be approximated, so that the electrical signals actually applied to the X and Y axes stepping motors will be the ones required to provide the stepping movements actually needed.

As noted in Step 1 of FIG. 20, the total distances in the X and Y directions are determined first. The total X distance is referred to as $\Delta X$ and the total Y distance as $\Delta Y$.

The next step (Step 2) is to select the particular quadrant containing the line to be approximated. The signs of $\Delta X$ and of $\Delta Y$ are then examined. If both $\Delta X$ and $\Delta Y$ are plus, the line to be approximated lies in quadrant AD (as defined in FIG. 4). If the sign of $\Delta X$ is plus and that of $\Delta Y$ is minus, the line lies in quadrant EH. Similarly, if the signs of both $\Delta X$ and $\Delta Y$ are minus, the line lies in quadrant IL. Finally, if the sign of $\Delta X$ is minus and that of $\Delta Y$ is plus, the line lies in quadrant MP.

There is then established, for each quadrant, the following plotter movement codes (each code represents the transformation constant to be applied to the plot values to transform the derived values to the real quadrant in which the line lies; obviously, no transformation is required if the line actually lies in the quadrant AD): an X code; an $X+Y/2$ code; and $X+Y$ code; an $X/2+Y$ code; and a Y code. From this point on, whenever $\Delta X$ or $\Delta Y$ are referred to, it will be assumed that the absolute values of these two quantities are being referred to, since all values have been transformed back to the first quadrant where both $\Delta X$ and $\Delta Y$ are positive.

The next step, Step 3, is used to determine whether the line to be approximated lies in the first or second half of the selected quadrant, i.e., the particular octant is selected. $|\Delta X|$ is compared with $|\Delta Y|$. If $|\Delta X|$ is larger than (or equal to) $|\Delta Y|$, then the line to be approximated is assumed to lie in the octant closer to the X axis, and the next step is Step 5. On the other hand, if the absolute value of $\Delta X$ is less than the absolute value of $\Delta Y$, then the line to be approximated lies in the octant closer to the Y axis. In such a case, the X code is interchanged with the Y code, and the $X+Y/2$ code is interchanged with the $X/2+Y$ code so that all further plotting calculations can be made with the assumption that X is always larger than Y. The transformation code at this point in time will include not only the transformations given as a result of Step 2 above, but will also include the transformations of Step 4.

At this point in time, at the beginning of Step 5, the line to be approximated has been identified with respect to the particular octant within which it lies, namely, octant AB, CD, EF, GH, IJ, KL, MN, or OP. One last narrowing down process is now required to determine which half of the selected octant contains the line to be approximated; this is realized by identifying the particular semioctant.

Referring to FIG. 4, it will be noted that whenever the total X value of the line (i.e., $|\Delta X|$) is at least twice the Y value of the line (i.e., whenever $|\Delta X|$ is greater than or equal to two times $|\Delta Y|$), the line will lie within the area defined by semioctant D. On the other hand, if $|\Delta X|$ is less than twice $|\Delta Y|$, then the line to be approximated lies within the semioctant C. ($\Delta X$ is always equal to or greater than the $\Delta Y$, by definition; if it were not so originally, then the transformation of Step 3, namely, substituting $\Delta X$ for $\Delta Y$, would accomplish this.) The foregoing comparison of $|\Delta X|$ with $2|\Delta Y|$ may be generalized by noting that if $|\Delta X|$ is greater than or equal to two times $|\Delta Y|$, then the semioctant desired is the one lying adjacent to an X or Y axis, namely one of the semioctants A, D, E, H, I, L, M, or P. However, if X is less than $2|\Delta Y|$, then the desired semioctant is one that is not adjacent to either the X or Y axis, namely one of the semioctants B, C, F, G, J, K, N, or O.

Next, by Step 7, the code for $X/2$ is computed from the known code for X. Finally, the transformation codes thus derived are used to execute the operations previously described with respect to the flow charts of FIGS. 13 or 17, depending upon whether at least time approximation determination is desired or a least deviation approximation is selected.

By way of example, assume that the desired semioctant were semioctant J. Then, by Step 2, the quadrant IL would be indicated, and plotter movement codes would be selected for this quadrant. Then, Step 3 would cause the selection of octant IJ. Step 4 would cause the interchange of the Y code for the X code and the interchange of the $(X/2+Y)$ code for the $(X+Y/2)$ code, since the value of $|\Delta Y|$ is greater than that of $|\Delta X|$ for this octant IJ. Next, as the result of the operation of Step 5, the particular semioctant J would be selected. Step 6 would then cause the substitution of the $(X+Y)$ code for the X code, and the substitution of the $(\Delta X-\Delta Y)$ code for the $\Delta Y$ code. The succeeding operations are the same as those described generally above, depending on whether the Minimum Plotting Time Method or the Minimum Plotting Error Method is to be employed for the line approximation.

Stepping motor system operation

Referring now to FIG. 21, a Veitch diagram is therein presented to demonstrate the manner in which the control circuitry for the operation of the stepping motors of FIGS. 5 to 8 may be operated in accordance with the invention. The diagram of FIG. 21 corresponds to the control of the X-axis stepping motor. It will be realized that the Y-axis motor may be controlled in identical fashion.

The control circuitry for each stepping motor may advantageously comprise a plurality of flip-flop stages (described in greater detail in FIG. 23 below). The flip-flop stages may be set in the manner to be described; for example, each pair of coils of a stepping motor (FIGS. 5 to 8), such as the pair $1s-4s$, may be controlled by a single flip-flop in place of the switch 24, with one output of the flip-flop establishing the energized state of the coils $1s-4s$ and the other output of the same flip-flop establishing the deenergized state of the associated coil set.

The Veitch diagram of FIG. 21 represents the various states which may be established by a number of control flip-flops in accordance with the invention. (FIG. 23, described below, is a circuit diagram used to effect the changes between the states of FIG. 21.) As represented in FIG. 21, the blocks designated XL1, XL2, and XL3 represent, respectively, the energized states or flip-flops controlling the corresponding coil sets. For example, XL1 may correspond to the energization state of the first coil set, $1s-4s$; XL2 may correspond to the energization state of the second coil set $3s-6s$; and XL3 may correspond to the energization state of the third coil set $2s-5s$. Similarly, the block $XL1+XL2$ corresponds to the state of energization of both the first and second coil sets, $1s-4s$ and $3s-6s$. The block $XL2+XL3$ corresponds to the energization of both the second and third coil sets, and the block $XL1+XL3$ corresponds to the energization of the first and third coil sets. To complete the diagram, additional states, $XL1+XL2+XL3$, representing the energization of all three coil sets, and NONE, representing the case where none of the coil sets are energized, are included, although these additional states are not used in the normal operation of the invention. For purposes of illustration, a clockwise rotation of the rotor 20 has been arbitrarily assumed to follow the energization of coils in the sequence XL1---XL2---XL3 and this has been considered to be a positive rotation or stepping motion, whereas the energization of the coils in a reverse sequence is assumed to produce a counterclockwise motion or negative rotation. In FIG. 21 the single-headed arrow XFP indicates a full step in the positive (clockwise) direction, whereas XFN represents a full step in the negative (counterclockwise) direction. Similarly, XHP represents a half step in the positive direction and XHN represents a half step in the negative direction.

The stepping of the rotor 20 in the indicated direction will result by proceeding from one state to another along the vertical and horizontal lines of the Veitch diagram of FIG. 21. Thus by proceeding from the state XL1, in which the first coil set is energized, to the state XL2, in which the second coil set is energized (compare FIGS. 5 and 6), a full step in the positive (clockwise) direction is achieved. By reversing this procedure, i.e., proceeding from XL2 to XL1, a full step in the negative or counterclockwise direction is achieved. Proceeding from XL2 to $XL2+XL3$ produces a half step in the positive direction (compare FIGS. 6 and 7) whereas proceeding in the reverse direction produces a half step in the negative direction. Where there are no lines interconnecting a pair of blocks of the Veitch diagram of FIG. 21, as for example between the state XL1 and the state $XL2+XL3$, there is no provision for energizing the coils in such a sequence other than by proceeding through one of the intermediate states such as XL2. The dashed lines providing interconnections between the states $XL1+XL2$, $XL2+XL3$, and $XL1+XL3$ indicate additional possible stepping motions which result in full steps of rotation of the rotor 20 (as shown in FIGS. 7 and 8). However, it may be less desirable to proceed in this fashion in controlling the motion of the stepping motor and, as will be described in further detail hereinbelow, provision may be made to avoid the energizing sequences indicated by the dashed lines of FIG. 21 in accordance with a particular aspect of the invention.

In the particular arrangement of the invention described, the states designated NONE and $$XL1+XL2+XL3$$

are not normally used, although they are states which may possibly occur under particular conditions. During a transient condition of the control flip-flop circuitry, for example when the equipment is first turned on, it is possible that one or the other of these energization states will be assumed by the control flip-flops. In fact, it may be desirable that the flip-flop control circuitry be permitted to begin with the energization of a preferred coil set each time the equipment is started. This is accomplished without producing rotation of the stepping motor by proceeding along the diagonal lines in the direction of the long, diagonal, single-headed arrows as shown in FIG. 21, to the XL1 state. Thus, when the equipment is initially turned on, all of the flip-flops are pulsed to the ON state, insuring that the block $XL1+XL2+XL3$ is reached, following which the flip-flops XL2 and XL3 are pulsed to the OFF condition so that the XL1 state is attained. From the XL1 state, the normal sequence of operation as described and shown in the Veitch diagram may be followed.

FIG. 22 is a somewhat simplified representation corresponding to the Veitch diagram of FIG. 21 and may be described as defining the diagonal intersection of a plane with an open cube (lines $a$, $b$ and $c$) and showing cube edge portions ($d$, $e$, $f$, $g$, $h$ and $i$). The preferred permissible paths, in proceeding from one energization state to another in the diagram of FIG. 22, are represented by the solid lines; the dotted lines are included merely to complete the cube but do not represent permissible changes of state. The dashed lines of FIG. 21 have been omitted, since these correspond to transitions which are avoided in the preferred operation of the invention. It should be noted that the diagram of FIG. 22 is a specific case of the more general form of the Veitch diagram of FIG. 21. That is, FIG. 22 is a three-dimensional diagram corresponding to the control of a stepping motor having three coil sets. The particular Veitch diagram of FIG. 21 is shown with three dimensions or coordinates also; however it will be understood that it is not so restricted but rather the Veitch diagram of the operation of the control circuitry of the invention may be $n$-dimensional, $n$ corresponding to the number of coil sets which may be separately energized.

FIG. 23 is a diagram of a portion of the circuit used to effect the changes in energization state described above in connection with FIGS. 21 and 22 (the full circuit, depicted in FIG. 24, is described below).

In FIG. 23 the blocks designated XL1, XL2, and XL3 each correspond to a flip-flop circuit controlling the energization of an associated set of two stepping motor coils. Each of the flip-flops XL1, XL2, and XL3 has two inputs and two outputs. As to inputs, each flip-flop has an "S" or Set input for setting flip-flop into its 1 or true state (in which state its associated stepping motor coils are energized), and each flip-flop also has an "R" or Reset input for resetting the flip-flop into its 0 or false state (in which state its associated stepping motor coils are not energized). As to outputs, each flip-flop has a 1 or true output and an 0 or false output. When a flip-flop has been set to its 1 state, it provides a signal on its 1 output line, the first flip-flop XL1 having such an output line designated in FIG. 23 as XL1–1. When a flip-flop has been set in its 0 state, it provides a signal on its 0 output line, designated in FIG. 23 as output XL1–0 for the same first flip-flop. No circuit diagram is illustrated for the flip-flops themselves since such circuits are known in the art. (The flip-flops are preferably of the kind known as "JK" flip-flops. Such flip-flops are constructed so that if input signals are accidently applied to both of the two flip-flop inputs, this anomoly is resolved by the flip-flop changing to a state opposite its previous state.)

In the diagram of FIG. 23 only positive stepping motor pulses (i.e., clockwise with respect to the plane of the drawings) will be described. The full circuit diagram of FIG. 24 depicts the circuit used for driving the stepping motor in either a clockwise or counterclockwise direction.

Each of the flip-flops XL1, XL2 and XL3 is controlled in state by an "OR" gate and three "AND" gates. The first flip-flop XL1 is controlled by "AND" gates 101, 102 and 103, and "OR" gate 104. The second flip-flop XL2 is controlled by "AND" gates 111, 112 and 113, and "OR" gate 114. The third flip-flop XL3 is controlled by "AND" gates 121, 122 and 123, and "OR" gate 124.

The circuit of FIG. 23 has two input lines, designated "A" and "B." Each signal, for example from a digital computer, is received to step the stepping motor a single increment (i.e., a half-step) in a clockwise direction when a pulse is received on the "A" line. This "A" pulse is passed to one input of each of the "AND" gates associated with each flip-flop. The "A" pulse is passed to all of the "AND" gates 101, 102, 103, 111, 112, 113, 121, 122, and 123.

Assume, at the time, that an "A" pulse is received by the circuit, and that no "B" pulse is received. This occurs when the motor controlled by the circuit is to be stepped one-half step. Assume also that the first flip-flop XL1 is off, that the second flip-flop XL2 is on, and that the third flip-flop XL3 is off—that is, that the first and third flip-flops XL1 and XL3 are each in their 0 states, with no current flowing to their associated stepping motor coils, and that the second flip-flop XL2 is in its 1 or true state, with current flowing through its associated coils. The first "AND" gate 101 receives, simultaneously, the "A" pulse and the XL3–0 pulse, the latter pulse coming from the 0 output line of the third flip-flop XL3. The coincidence of the "A" and the XL3–0 signals causes this "AND" gate 101 to produce an output signal to the "S" input of the first flip-flop XL1, thus setting this flip-flop to its 1 state. No outputs are produced from the other "AND" gates 102 or 103 since there is no coincidence of pulses into the inputs of these gates. Also, there is no output from the "OR" gate 104 since no input is received by this gate.

At the same time, as to the second flip-flop XL2, which was previously in its "ON" or 1 state, none of its associated first "AND" gates receives simultaneous inputs on all input lines. Thus, the second flip-flop remains on.

Finally, as to the third flip-flop XL3, it will be noted that no simultaneous receipt of pulses occurs on the input lines of the "AND" gates 121, 122, or 123 of this third flip-flop. Consequently, this third flip-flop XL3 remains in its 0 or off state.

From the foregoing it is seen that if the second flip-flop is on, and a half-step indication is received by the circuit (i.e., the circuit receives an "A" input signal but no "B" input signal), the successive state of the flip-flop array is for flip-flops XL1 and XL2 to both be energized, resulting in a clockwise rotation of the stepping motor by one increment or a half-step.

If, in the foregoing illustration, a "B" or full step pulse was passed to the circuit at the same time that the "A" or positive step pulse was received, the same operation as described above would have been effected with the exception that the third "AND" gate 113 of the second flip-flop XL2 would have been energized upon the simultaneous receipt of three pulses on its input lines (namely, XL3–0, "B," and "A"), resulting in the passing of a signal to the associated "OR" gate 114, which in turn results in the production of an "R" signal output to the second flip-flop XL2. This "R" signal would have returned the second flip-flop XL2 to its 0 or reset state, leaving only the first flip-flop XL1 in its 1 state. Thus, the second flip-flop XL2 would be turned off, with the first flip-flop turned on, resulting in two increments of stepping motor motion in the clockwise direction, or the effecting of a full step in this clockwise direction.

An analysis of the other gates associated with the flip-flops will show that the receipt of only an "A" pulse will cause a stepping motor motion of a half step in the positive direction, while the receipt of simultaneous "A" and "B" pulses will always effect a full step rotation of the stepping motor in the positive direction.

As has been indicated above in connection with FIGS. 21 and 22, there are two possible combinations of flip-flop states that are not used in effecting stepping motor operation. These two are: (1) the state where none of the flip-flops are on, and (2) the state where all of the flip-flops are on. An analysis of the circuit of FIG. 23 will show that if none of the flip-flops are on when an input pulse is received, all of the flip-flops will then be turned on. Then, whenever all three of the flip-flops are on, a subcircuit 140 turns off two of the three flip-flops. The sub-circuit within the dashed line block 140 causes the second and third flip-flops to be transformed back to their off or reset state in the event that all three flip-flops attain their set or "ON" state at the same time. This 140 block circuit is made up of two "AND" gates 145 and 146. Each of these two "AND" gates is connected to receive an output signal from the "ON" state of two flip-flops and are interconnected with the circuit to turn off two of the three flip-flops when all three are energized to the "ON" state. The single-headed diagonal arrows between the blocks designated "NONE" and

"XL1+XL2+XL3"

and between the boxes "XL1+XL2+XL3" and "XL1" correspond to the above-described series in states wherein first none of the flip-flops are in their "ON" state, and finally only one of the flip-flops is in its "ON" state. This is also illustrated in FIG. 22 by single arrowed lines $j$ and $k$.

In the operation of a stepping motor plotting system, using the type of stepping motor described above, certain advantageous modes of operation have manifested themselves as appreciably more desirable than other modes.

As has been explained above, the stepping motor described has three sets of coils. Half-step operation is realized when one set of coils is energized at one time interval, and two sets of coils are energized at a succeeding time interval, or when two sets of coils are energized at one time interval, and a single set of coils is energized at the succeeding time interval. The foregoing half-step operation is usually realized at a relatively high speed—for example, at 400 steps per second for a given motor configuration and current input. Further, as has been explained above, full-step operation is realized when a single set of coils has been energized at one time interval and another single set of coils is energized at a succeeding time interval, and also when two sets of coils have been energized at one time interval and another combination of two sets of coils is energized at the succeeding time interval. It is thus realized that half-step operation is produced during changes from single-coil set to double-coil set operation, and also during changes from double-coil set to single-coil set operation; full-step operation is realized during changes from single-coil set operation to single-coil set operation and also during changes from double-coil set operation to double-coil set operation.

It has been found, however, that the greatest current input is required in the motor coils during a given time interval when operation is in the mode of double-coil set to succeeding double-coil set energization. All other modes of operation, namely, single-coil set to double-coil set, double-coil set to single-coil set, and single-coil set to single-coil set require appreciably less current to operate the motor at a given speed. Conversely, for a given current input to the motor coils, the double-coil set to double-coil set mode of operation requires a greater length of time than any other mode of operation. Accordingly, it is desirable to arrange the stepping motor energization circuit so that this slower operation mode is avoided.

The slower operation mode, namely, full-step energization involving first one combination of two coil sets and then the energization of another combination of two coil sets, is avoided in the preferred embodiment of the invention. The driving circuit from the motor is arranged so that whenever double-coil set to double-coil set operation would be indicated, the operation is instead switched to a double-coil set to single-coil set operation. In such a case, the full-step signal would instead be converted to a half-step operation, allowing the stepping motor to maintain the highest speed it is capable of even though the motor will have moved one-half-step less than might otherwise be desired. This arrangement proves especially advantageous when a long series of full step operations are required, as for example when a plotter is to be called upon to draw a long series of full-steps to produce a long straight line. If, at the start of the drawing of the line, the motor is in a two-coil set energization, and the succeeding input signal to the circuit would call for a whole step operation, the circuit changes this full-step command to a half-step command in order to take the stepping motor from a two-coil set energization state into a single-coil set energization state. Then, the succeeding series of full-step input signals would cause the motor to have succeeding single-coil sets energized, allowing highest speed operation for the entire plotting operation with the sole exception of the first step conversion of a full-step to a half-step.

Reference is now made to FIG. 21 wherein the foregoing preferred operation mode is illustrated. In FIG. 21 it will be noted that solid lines between blocks are labeled XFP (an X axis, Full-step in the Positive direction); XHP (an X axis, Half-step, Positive direction); XFN (an X axis, Full-step, Negative direction); and XHN (an X axis, Half-step, Negative direction). The changes in state indicated by the solid lines between blocks are preferred modes of coil set changes. However, three of the lines between the blocks are indicated by dashed lines. These are the lines between the boxes labeled

"XL1+XL2"

"XL1+XL3," and "XL2+XL3." These dashed line changes represent two-coil set to two-coil set changes, and are not desired.

In FIG. 24, the "AND" gates within the dashed line box 150 (namely, "AND" gates 151, 152, 153, 154, 155 and 156) are responsible for permitting changes between the undesirable two-coil set to two-coil set operation referred to. Accordingly, in the preferred embodiment of the invention, these "AND" gates within the dashed line boxes 150 are excluded from the circuit, as by considering them physically cut out of the circuit by a severing of the interconnecting lines at the places where they enter the block 150. This excluding of these "AND" gates is realized in the circuit of FIG. 23—the circuit of FIG. 23 does not permit operation in the least desired two-coil set to two-coil set operation. The only other difference between FIGS. 23 and 24 is that FIG. 24 includes the additional circuitry required for allowing the operation of the stepping motor in either the negative or the positive direction. Thus, if a negative step pulse "C" is introduced into the circuit of FIG. 24 and no other input signal is received, the stepping motor will rotate one-half-step in the negative, counter-clockwise direction (with respect to the plane of the drawing). As will be noted by an examination of the circuit of FIG. 24, the negative step pulses "C" are fed to appropriate "AND" gates, effecting circuit operation in a manner analogous to that described above with respect to FIG. 23 for the receipt of positive step pulses "A." If simultaneous negative step pulse "C" and full-step pulse "B" signals are received, the stepping motor will operate a full-step in the negative direction. Finally, as explained above, the stepping motor will rotate a half-step or a full-step in the positive direction upon the receipt of, respectively, a positive step pulse "A" and no other pulse, or a positive step pulse "A" signal with the receipt of a full-step pulse "B."

It will thus be apparent that the use of a particular stepping motor in a digital incremental plotter in the manner described provides improved operation thereof by increasing the versatility of the plotter and permitting it to approximate lines to be plotted with greater precision. This improvement is achieved without an unwanted increase in the time required for the plotting operation. Methods in accordance with the invention have been described above to show how the plotter may be directed to operate for minimum plotting time or alternatively, for minimum plotting error in the approximation of a given line. The result is an improved electronic control of a variable step size stepping motor without the necessity for cumbersome gear shifting arrangement or similar auxiliary equipment.

Although there have been described specific arrangements of a display system and methods in accordance with the invention for illustrating the manner in which the invention may be used to advantage, it will be appreciated that the invention is not limited thereto. Accordingly, any

We claim:

1. The method of controlling a digital incremental plotting system having a plotting mechanism positioned by a pair of stepping motors capable of producing maximum incremental movements of a given length simultaneously along each of a pair of mutually orthogonal coordinate axes during each of equal successive plotting intervals, comprising the steps of: determining the position and direction of a line segment to be plotted as an approximation, and selectively controlling at least one of the pair of stepping motors to produce incremental movements of variable lengths of the plotting mechanism during each of selected ones of the successive plotting intervals with respect to a pair of mutually orthogonal coordinate axes in accordance with a predetermined approximation of the line segment, each of said variable lengths being equal to or a predetermined proportion of said given length.

2. The method of controlling a digital incremental plotting system having a plotting mechanism positioned by a pair of stepping motors capable of producing maximum incremental movements of a given length simultaneously along each of a pair of mutually orthogonal coordinate axes during each of equal successive plotting intervals, comprising the steps of: comparing the coordinates of a line segment to be plotted to determine the direction of the line segment, and selectively controlling said stepping motors to concurrent execute incremental movements of variable distances with respect to two mutually orthogonal coordinate directions during each of selected ones of the successive plotting intervals in accordance with a predetermined approximation of the line segment, each of said variable distances being equal to or a predetermined proportion of said given length.

3. The method of controlling a digital incremental plotting system having a plotting mechanism positioned by a pair of stepping motors, comprising the steps of: comparing the mutually orthogonal coordinates of a line segment to be approximated with minimum plotting error, to determine the direction of the line segment; establishing paths of possible traversal of a plotting mechanism from a given reference point, with respect to the line segment to be approximated; comparing the distances between selected points on said paths of possible traversal of the plotting mechanism with corresponding points along the line segment to be approximated to determine the traversal path of the plotting mechanism having the minimum deviation from the line segment to be approximated; and selectively controlling the stepping motor in concurrently executed combinations of orthogonal step movements of variable size and of equal time interval to cause the plotting mechanism to traverse a path having the least deviation from the line segment to be approximated.

4. The method of controlling a digital incremental plotting system having a plotting mechanism positioned by a pair of stepping motors, comprising the steps of: comparing the coordinates of a line segment to be approximated in a minimum plotting time; selectively controlling a first stepping motor to step in successive step increments of equal size along a first coordinate axis, and selectively controlling a second stepping motor to produce nonmovement relative to a second coordinate axis or movement along the second coordinate axis in step increments having the same size as or one-half the size of said step increments of equal size in accordance with the coordinates of the line segment in a second coordinate axis direction relative to the respective corresponding coordinates of the line segment in the first coordinate axis direction, the incremental step movements along the first and second coordinate axes executed concurrently and during equal time intervals.

5. The method of controlling a digital incremental plotting system having a plotting mechanism positioned by stepping motors, comprising the steps of: comparing the coordinates of a line segment to be approximated to determine the polar sector in which the line segment is included, generating stepping motor command signals corresponding to selective step movements of variable length of the plotting mechanism to be executed simultaneously and in equal time intervals in a predetermined sector, and transposing said command signals to cause selective movements of the plotting mechanism in the polar sector in which the line segment is included.

6. The method of controlling a digital incremental plotting system having a plotting mechanism positioned by a pair of stepping motors arranged to control respective movement of the mechanism in two orthogonal directions in order to provide an approximation of a line to be plotted, comprising the steps of: beginning the plot with the plotting mechanism positioned at a selected reference point; selecting possible alternative paths which the plotting mechanism may follow from the reference point to approximate the line to be plotted; comparing distances between selected points on the possible alternative paths and corresponding points on the line to be plotted in order to select the least distance therebetween, and electronically controlling the stepping motors to selectively vary the incremental step movements while maintaining the time interval of the plotting mechanism to produce an approximation with minimum plotting error relative to the line to be plotted.

7. A method of controlling a digital incremental plotter of the kind having two stepping motors each connected to control the movement of a plotting member in a direction orthogonal with respect to the plotting member associated with the other motor, and each motor selectively energizable to effect movements through a given distance and through one-half the given distance independent of the other motor, comprising the steps of selectively: concurrently effecting a step movement of one motor through the given distance and a step movement of the other motor through one-half the given distance, during one interval; effecting a step movement of one motor through the given distance while preserving the other motor from movement, during another time interval; effecting a step movement of one motor through one-half the given distance while preserving the other motor from movement, during still another time interval; concurrently effecting step movements of both motors through the given distance during yet another time interval; and concurrently effecting step movements of both motors through one-half the given distance during a yet further time interval; whereby said plotter is controlled to selectively provide any of twenty-four mutually different plotting movements in any predetermined order for improved line approximations.

8. The method of controlling a digital incremental plotting system having a plotting mechanism positioned by stepping motors, comprising the steps of: examining the signs of the orthogonal coordinates of a line segment to be approximated to determine the particular quadrant in which the line segment is included; comparing the values of the orthogonal coordinates of the line segment to determine the particular octant within the particular quadrant in which the line segment is included; comparing the value of one orthogonal coordinate of the line segment with twice the value of the other orthogonal coordinate to determine the half of the particular octant in which the line segment is included; generating stepping motor command signals corresponding to step movement of the plotting mechanism in variable increments in a predetermined octant half; and transposing said command signals to cause selective movement of the plotting mechanism in the octant half in which the line segment is included.

9. The method set forth in claim 8, wherein the generated stepping motor command signals correspond to movement of the plotting mechanism in successive step increments of equal size along a coordinate axis concurrently with nonmovement or step increments having the same size as said step increments of equal size, or a size which is one-half that of said step increments of equal size along a second coordinate axis.

10. The method set forth in claim 8, wherein the step of generating stepping motor command signals comprises the steps of selecting possible alternate paths which the plotting mechanism may follow from a reference point to approximate the line segment, comparing distances between selected points on the possible alternate paths and corresponding points on the line segment in order to select the least distance therebetween, and generating stepping motor command signals corresponding to step movements of the plotting mechanism which will produce an approximation with minimum plotting error relative to the line segment.

11. The method of controlling a digital incremental plotting system having a plotting mechanism positioned by a pair of stepping motors, comprising the steps of: comparing the coordinates of a line segment to be approximated in a minimum plotting time; selectively controlling a first stepping motor to advance the plotting mechanism in successive step increments of a given size along a first coordinate axis, the length of the line segment therealong being greater than the length of the segment along a second coordinate axis; determining upon completion of each of the successive step increments along the first coordinate axis the distance in the direction of the second coordinate axis which will exist between the plotting mechanism and the line segment upon completion of the next successive step increment along the first coordinate axis in the absence of movement of the plotting mechanism along the second coordinate axis during said next successive step increment, and selectively controlling a second stepping motor to advance the plotting mechanism in a step increment of one-half said given size along said second coordinate axis concurrently and in equal time interval with each of the successive step increments of given size along the first coordinate axis which would in the absence of advancement of the plotting mechanism along the second coordinate axis result in a distance in the direction of the second coordinate axis between the plotting mechanism and the line segment which is greater than one-fourth said given size.

12. The method of controlling a digital incremental plotting system having a plotting mechanism positioned by a pair of stepping motors arranged to control respective movement of the mechanism in two mutually orthogonal directions in order to provide an approximation of a line to be plotted comprising the steps of: beginning the plot with the plotting mechanism position at a selected reference point; determining prior to each of a succession of variable incremental step movements of the plotting mechanism which of a plurality of possible directions of step movement will provide the least deviation from the line to be plotted; and electronically controlling the stepping motors to advance the plotting mechanism through those step movements which will provide the least deviation, said step of determining which direction of step movement will provide the least deviation including the step of determining the maximum distance which will lie between the actual line plot and the line to be plotted if the plotting mechanism undergoes a step movement of given size in a first of the two mutually orthogonal directions, a step movement of twice the given size in the first orthogonal direction, a step movement of twice the given size in the first orthogonal direction and of the given size in the first orthogonal direction followed by a further step movement of twice the given size in the first orthogonal direction and of the given size in the second orthogonal direction.

References Cited

UNITED STATES PATENTS

| | | | |
|---|---|---|---|
| 2,941,136 | 6/1960 | Marantette et al. | 310—49 XR |
| 2,833,941 | 5/1958 | Rosenberg et al. | 307—149 |
| 3,005,941 | 10/1961 | Heggen | 310—49 XR |
| 3,239,738 | 3/1966 | Welch | 318—138 |
| 3,250,977 | 5/1966 | Heggen | 310—49 XR |
| 3,327,185 | 6/1967 | Kawada | 318—25 XR |
| 3,327,191 | 6/1967 | Goto | 318—138 |
| 2,774,922 | 12/1956 | Thomas | 318—162 |
| 3,146,386 | 8/1964 | Gerber | 310—49 |
| 3,191,111 | 6/1965 | Greene | 318—162 |
| 3,217,221 | 11/1965 | Heggen et al. | 310—49 X |
| 3,287,569 | 11/1966 | Carney | 310—49 X |

ORIS L. RADER, Primary Examiner

G. R. SIMMONS, Assistant Examiner

U.S. Cl. X.R.

318—28, 138

PO-1050
(5/69)

UNITED STATES PATENT OFFICE
CERTIFICATE OF CORRECTION

Patent No. 3,461,365      Dated August 12, 1969

Inventor(s) James E. Newland and Robert C. Morton

It is certified that error appears in the above-identified patent and that said Letters Patent are hereby corrected as shown below:

Column 6, line 2, for "digtial" read -- digital --.
Column 7, line 70, for "valves" read -- values --. Column 8, line 42, for "like" read --line--. Column 11, line 47, for "with" read -- within --. Column 12, line 9, after "If" strike out "the", third occurrence,; line 25, for "ploted" read -- plotted --; line 31, for "radio" read -- ratio --; line 73, the equation should read $$BG = OC - \frac{3(OC)}{|\Delta X|}(|\Delta Y|)$$

Column 13, line 31, for "at", second occurrence, read -- a --.
Column 14, line 43, for "beapplied" read -- be applied --; line 47, for "and" read -- an --. Column 15, line 25, for "at" read -- a --; line 64, for "deenergized" read -- de-energized --.
Column 24, line 15, strike out the comma and insert a semicolon.

SIGNED AND
SEALED
APR 28 1970

(SEAL)
Attest:

Edward M. Fletcher, Jr.
Attesting Officer

WILLIAM E. SCHUYLER, JR.
Commissioner of Patents